(12) United States Patent
Cusati

(10) Patent No.: US 12,368,805 B1
(45) Date of Patent: Jul. 22, 2025

(54) SYSTEM AND METHOD FOR USING ARTIFICIAL INTELLIGENCE TO IDENTIFY AND RESPOND TO INFORMATION FROM NON-HIERARCHICAL BUSINESS STRUCTURES

(71) Applicant: Edward J. Cusati, Greenwich, CT (US)

(72) Inventor: Edward J. Cusati, Greenwich, CT (US)

( * ) Notice: Subject to any disclaimer, the term of this patent is extended or adjusted under 35 U.S.C. 154(b) by 0 days.

(21) Appl. No.: 19/073,297

(22) Filed: Mar. 7, 2025

Related U.S. Application Data

(63) Continuation-in-part of application No. 18/661,608, filed on May 11, 2024.

(51) Int. Cl.
*H04M 11/04* (2006.01)
(52) U.S. Cl.
CPC .................................. *H04M 11/04* (2013.01)
(58) Field of Classification Search
CPC .................................................... H04M 11/04
See application file for complete search history.

(56) References Cited

U.S. PATENT DOCUMENTS

| 8,977,662 | B1 | 3/2015 | Hilliar |
| 11,757,856 | B2 * | 9/2023 | Mieno ................... H04L 9/0838 |
| 2006/0059063 | A1 | 3/2006 | LaComb et al. |
| 2014/0378088 | A1 * | 12/2014 | Goel ..................... H04W 4/029 |
| | | | 455/404.2 |
| 2015/0371163 | A1 | 12/2015 | Noh et al. |
| 2015/0381649 | A1 * | 12/2015 | Schultz .............. G06Q 10/0635 |
| | | | 726/25 |
| 2017/0118240 | A1 * | 4/2017 | Devi Reddy .......... G06N 20/00 |
| 2020/0410415 | A1 | 12/2020 | Harris et al. |
| 2023/0164740 | A1 * | 5/2023 | Sarashiya ............... H04M 1/00 |
| | | | 455/456.1 |

FOREIGN PATENT DOCUMENTS

| CN | 110518973 A | * 11/2019 | ........... G06K 9/6256 |

OTHER PUBLICATIONS

Fristchek et al. "Deep Learning for the Gaussian Wiretap Channel" (2019) (https://arxiv.org/pdf/1810.12655) (Year: 2019).*
NI Business Info (UK), Business organisational structure, https://www.nibusinessinfo.co.uk/content/business-organisational-structure (last visited May 11, 2024).

* cited by examiner

*Primary Examiner* — Sujay Koneru
(74) *Attorney, Agent, or Firm* — Jonathan Bick

(57) ABSTRACT

System and method to flatten a hierarchical organizational structure by applying Magic Grid, specifically by generating a trained machine learning model using artificial intelligence using training data comprising a history of an organization's deep value customer satisfaction ratings and innovation (CSI) and associated operating status data of said organization, outputting indications of whether an alarm should be triggered, wherein said training model weights one or more nodes of an artificial neural network; providing said model with current operating status data, outputting a value indicating whether an alarm should be triggered, triggering said alarm based upon said value, receiving user input via a software interface, and further training said model based upon said user input.

1 Claim, 7 Drawing Sheets

SYSTEM AND METHOD FOR USING ARTIFICIAL INTELLIGENCE TO IDENTIFY AND RESPOND TO INFORMATION FROM NON-HIERARCHICAL BUSINESS STRUCTURES

CROSS-REFERENCES

This application is a continuation-in-part of the nonprovisional application Ser. No. 18/661,608 filed 11 May 2024.

BACKGROUND OF THE TRANSFORMATIONAL FUTURE OF WORK INVENTION

Field of the Invention

The current invention relates to disruptive technologies and the deliberate dismantling of established processes in order to make way for improved methods of production. More particularly, the invention utilizes Artificial Intelligence to measure internal customer-satisfaction and innovation (CSI) metrics in order to foster replacing relic hierarchical organizations with horizontal organizations, new processes, and technologies to improve work for workers and business for investors.

BACKGROUND OF THE INVENTION

Artificial intelligence (AI) is software. AI software differs from conventional software because traditional software's algorithm is created by a programmer, whereas AI software creates its own algorithm. Algorithms based on sub-ideal algorithms are likely to have unnecessary difficulties. The present invention's embodiment addresses this shortcoming.

Failure to use non-hierarchical formulation is not simply a matter of missed opportunities. Rigid hierarchies, with their siloed data and sluggish decision-making . . . even with the help of teams, create a fundamental mismatch between the potential of AI and the reality of inflexible business structures. In addition, these structures often breed a host of costly systemic problems. These include high employee turnover costing $1T/yr., low transformation performance . . . spend $1.5T/year, and low productivity . . . fallen to only 1.1%/yr. Other problems include politics, low long-term survival, and serious cultural clashes.

The present invention discloses a new kind of flat, non-hierarchical formatting system. The formatting is based on trust emanating from the CEP that enables empower workers. This empowerment ultimately pinpoints in near real-time performance and non-performance for every area of the entire company. It 'is a world where companies overcome the chokehold of hierarchies to deliver on the promises of AI.

The prior art made of record and not relied upon is considered pertinent to this disclosure:
  US 2015/0371163 A1
  US 2020/0410415 A1
  US 2006/0059063 A1.

Existing machine learning is generally dependent upon rigid hierarchies; thus the results may be sub-optimal because they remain anchored to these outdated structures, creating a fundamental mismatch between the potential of AI and the reality of inflexible decision-making.

In sum, the present invention is the combination of the Deep Value CSI Assisted Management and Operations Copilot (AMO-Copilot) offers a powerful AI open-source business application platform that fosters third-party application development designed to augment human capabilities and foster innovation within an organization. However, to fully unlock the potential of AMO-Copilot and transition from traditional hierarchies to a future of work built on AI-human collaboration, a strong foundation is crucial.

Deep Value CSI method (fully disclosed in provisional patent application 63/454,638) provides this essential foundation by creating a culture of trust, empowerment, and ownership. As discussed above, traditional hierarchical structures can impede effective AI implementation. Approval bottlenecks and a lack of ownership can slow down decision-making and hinder the ability of human workers to leverage AI insights effectively.

More specifically the present invention builds upon the prior art and increases emphasis on certain elements, as follows:
1. Clarifications:
    a. This invention enables replacing relic hierarchical organizations with responsive horizontal organizations and new processes.
    b. Horizontal organizations were not previously possible due to the extraordinary complexity of horizontal cell interconnectivity and the reduction in career path mobility. This invention enables the interconnection of exponentially complex components.
2. New invention elements:
    a. Spine Grid to:
        i. Facilitate more easily viewing and analyzing large numbers of MBUs.
        ii. Enable zooming capability . . . analogous to map zooming.
    b. Left and right MBU Grid height adjustment.
    c. Master MBU Status Charts:
        i. This is a new family of color-coded charts that displays every MBU in a spreadsheet type of form.
        ii. These charts enable near real-time extracting and displaying of MBU performance/non-performance information that will forever change how executive management will see and manage their business. This feature enables Early Problem Identification . . . a key item to longevity and business success.
        iii. Clicking on cells within an MBU Status chart brings up a detailed MBU.
        iv. Clicking on an area of a detailed MBU will enable a pop-up showing further details.
        v. Context Button to enable viewing a limited number of connected MBUs through real time configuration of a greatly simplified subset Magic Grid. This will enhance and simplify viewing and analysis.
        vi. Root Cause: Displaying the relationship of underperforming MBUs . . . both the root cause MBU and other in-the-flow MBUs that become affected by the root cause MBU difficulty. Shown by adding small solid (for root cause) and open (for in-the-flow) triangles on cells of MBU Status Charts.
        vii. New underperforming cells will pulse.
    d. Critical Impediments Chart: Like the Master MBU Status Charts displays every MBU. The general background will be one color, a soft shade such as a pale yellow (roughly corresponding to wavelengths between 570 and 580 nanometers (nm)). This invention displays all company/division (MBUs) that are being negatively impacted by external impediments to performance. These impediments are displayed on the new Critical Impediments Chart and will have pop-up capability for greater detail. New impediments will display vividly or pulse until reset by management.

e. Innovation:
  i. Depiction of Innovation will be displayed on the new Master MBU Innovation Chart.
  ii. For increased attention, new innovation stars will pulse.
k. Artificial Intelligence (AI): Describes how through AI the invention will predict future MBU and potentially financial performance.

The present invention uses AI by looking at historical MBU's (node's) Customer Satisfaction (CS), and Innovation (I) data performance values and finding time related correlations of performance value from early nodes in the business process with later business critical nodes in the process. The system will also look for performance correlations of early CS/I nodes with later in time financial performance. (CS or I ratings data at node "A" at an earlier point in time "Y" becomes predictive of a performance data rating of "B" sometime in the future at critical business node "Z" and possibly future financial performance.) This AI capability would enable the system to predict operating performance or financial results with accuracy at an earlier date about what will happen to a critical business node or financial report at some later date. Such AI prediction would enable Very Early Problem Identification. These predictions will be earlier than what will be available from the near-real-time performance charts currently being deployed by Magic Grid Flow Analysis (MGFA).

3. Increased emphasis:
  a. Customer centricity throughout the company.
  b. Exponential complexity of interconnecting MBUs.
  c. The importance of Innovation is dramatically emphasized. The system sets the stage for management to significantly reward new innovation and discusses why this is critical to business success.

SUMMARY OF THE INVENTION

The present invention uses a method for reformatting data to be used by a machine learning machine to teach an AI software to properly build a more effective algorithm.

The method is known as Deep Value CSI. The method uses as Interconnecting nodes (MBUs) to track performance. It does so by measuring and rewarding MBU performance through customer satisfaction feedback. Incentivizing Innovation that overcomes low promotion in a flat structure and fosters Hyper Learning . . . a desire for workers to look for transformational digital change to their work. Building near-real-time heat maps for pinpointing the location of early problem identification.

More specifically, the reformatting of the hierarchical data structure results in the capability of Monitoring internal nodes and external companies/events; Analyzing MBU Customer Satisfaction deviation; Analyzing Competitive Optimization; Gating to shut down crisis MBUs; and providing early warnings to subsequent MBUs. It also provides data for supporting: Future company financial performance; Human impact; Vision and Strategy development and Vision and strategy interpretation for MBUs.

The reformatted data may be used to create reports and action plans for: Empowered Hyper Learning Workers; Enhanced agile, scrum, teams . . . etc. and super charges business operations and performance.

Said reformatted data are stored in a database which the AI software uses to prepare and revise its algorithm. More specifically still, said reformatted data communicate with an Open-Source platform AI application generator.

The AI software algorithm is used to:
1. Monitor specific internal and external elements that can impact MBU performance.
2. Predict impacts on specific MBU functions and company results.
3. Gate selective underperforming MBU processes and outputs to prevent contamination.

The AI software eliminates the Upward Spiral of Skill Extraction (promoting the best workers to paper shuffling management) that kills productivity. But Deep Value CSI significantly minimizes Career Paths . . . workers remain in their chosen field working in their craft at the operating level. This was the traditional downfall of flatter organizations. However, in Deep Value CSI workers are richly rewarded for innovation . . . the replacement for career path Skill Extraction.

Thrives on Low Turnover. Hierarchies have a natural resistance to low turnover which hampers necessary hierarchical career path development.

With experienced workers remaining at the functional level, there is a new level of Innovation, Execution and Transformation Program success.

Removes significant hierarchical levels overcoming the Structural Flaws of today's relic hierarchical organizations and replaces them with a new flatter structure that overcomes the frailties of today's flat structures. This transformation aims to create a flatter more empowered and agile organization.

Predictive Deep Value CSI AI for Business Vision and Strategy

The present invention uses AI to help:
1. Deep Value CSI, through MBU customer satisfaction results, understands the strengths and weaknesses of every element of the company. AI will be primed to understand a broad array of key external company-related elements and problems. These combined understandings becomes inputs for management to more creatively develop clear, coherent and actionable Vision, Strategies and policy scenarios that it can debate with AI.
2. AI understanding final simple, actionable and coherent vision, strategies and policies along with management established MBU guidelines will help interpret what they mean for every MBU leader. Thus, empowered MBU leaders will use AI as a critical aid guiding their local decisions. AI can also help with developing stories and metaphors to help continually communicate throughout the company.
3. Deep Value CSI MBU Master Charts and with AI will facilitate early problem identification.
4. Ultimately understanding vision, strategy, and results along with gating capability will enable Deep Value CSI AI to become a critical business management assistant helping "drive" the business.

The current invention discloses Deep Value CSI AMO-Copilot, an open-source platform designed to foster a global community of independent developers who create innovative AI business applications. These AI applications function as "copilots" for management and empowered workers within Deep Value CSI organizations, to supercharge business operations and performance.

The current invention requires the implementation of the method known as Deep Value CSI as the foundation for Deep Value CSI AMO-Copilot and minimizes its limitations. This foundation is an innovative "Future of Work" foundation that fosters a distinct culture of CEO-directed trust . . . by empowering workers—the basis of high performing organizations, creates an environment in an AI world that Dr. Edward Hess calls Hyper Learning which is a need to learn, unlearn, and relearn continually in order to adapt to the speed of change, and maximizing the effectiveness of AI solutions.

Positive and Negative Sets for Classification

Depending on the specific prediction task, supervised learning algorithms might require labeled data categorized as "positive" or "negative" sets. For instance, if the goal is to predict project delays, historical data on projects that were completed on time (negative set) and projects that experienced delays (positive set) would be necessary to train the model.

The size and quality of these labeled datasets are critical for effective classification. AMO-C might leverage a combination of historical data and human expert labeling to generate these sets.

Algorithms

Some supervised learning algorithms that might be considered for AMO-C, along with their strengths and potential applications include:

1. Decision Trees:
    Function: Decision trees are a classification and regression technique that work by creating a tree-like structure with branching conditions. The algorithm asks a series of questions about the data points, directing them down to specific branches based on their answers. Each leaf node of the tree represents a predicted outcome.
    Strengths: Decision trees are interpretable, meaning you can understand the logic behind their predictions. They handle mixed data types (numerical and categorical) well and require minimal data pre-processing.
    Potential Use Cases in AMO-C: Predicting project delays, identifying potential employee churn, classifying customer satisfaction levels.
2. Random Forests:
    Function: Random forests are an ensemble method that combines multiple decision trees. Each tree is trained on a random subset of features and data points. The final prediction is made by aggregating the predictions of all individual trees.
    Strengths: Random forests are generally more robust to overfitting than decision trees and can handle complex datasets with high dimensionality (many features).
    Potential Use Cases in AMO-C: Similar to decision trees, random forests can be used for various classification and regression tasks within AMO-C. Their strength in handling complex data might be beneficial for tasks like predicting resource allocation needs or optimizing inventory management.
3. Support Vector Machines (SVMs):
    Function: SVMs are a powerful technique for classification that aims to find a hyperplane in the feature space that best separates the data points belonging to different classes.
    Strengths: SVMs are effective in high-dimensional spaces and work well with limited data. They are also robust to outliers in the data. In Deep Value CSI data may be limited.
    Potential Use Cases in AMO-C: SVMs could be useful for tasks like anomaly detection (identifying unusual patterns in operational data) or customer segmentation (classifying customers into different groups based on their characteristics).
4. Logistic Regression:
    Function: Logistic regression is a statistical method for binary classification problems. It predicts the probability of an event occurring based on independent variables.
    Strengths: Logistic regression is interpretable and provides a probability score for its predictions. It's also relatively computationally efficient.
    Potential Use Cases in AMO-C: Logistic regression could be used for tasks like predicting customer churn (the probability of a customer ceasing business) or identifying potential risks within projects (the probability of encountering roadblocks).

Choosing the Right Algorithm

The best supervised learning algorithm for AMO-C will depend on the specific task at hand and the characteristics of available data. Here are some factors to be considered:
    Data type: Are the data numerical, categorical, or a mix of both?
    Data complexity: Are data high-dimensional (many features)? Does it contain a lot of noise or outliers?
    Interpretability: Is it necessary to understand the reasoning behind AMO-C's predictions?
    Task type: Is classification (predicting categories) or regression (predicting continuous values) being performed?

These factors will be considered and the strengths of each algorithm, in selecting the most suitable technique for specific needs within AMO-C.

Machine Learning Algorithms and Business Rule Examples

Strategic Level:
    Challenge: Limited data and human bias can hinder strategic decision-making.
    Example Algorithm: Random Forest—Analyzes large datasets to identify patterns and trends in market data.
    Business Rule Example: "If a new market shows a customer satisfaction rating above X %, prioritize resource allocation for product development in that market."
MBU Leadership:
    Challenge: Challenges include workload management, resource allocation, and identifying skill gaps within MBUs.
    Example Algorithm: Support Vector Machine (SVM)—Identifies anomalies in data patterns, useful for detecting deviations from project timelines.
    Business Rule Example: "If an MBU's project timeline deviates by Y % from the forecast in AMO-C, trigger a resource allocation review for that MBU."
Product Lifecycle Management:
    Challenge: Each product 332 lifecycle stage has its own challenges (e.g., rapid iteration in introduction, cost optimization in maturity).
    Example Algorithm (Introduction): Decision Tree— Analyzes customer sentiment data to identify areas for product improvement.
    Business Rule Example (Introduction): "During product introduction, if negative customer sentiment about a specific feature is detected, prioritize product improvement for that feature."

Security Protocols and Potential Biases

AMO-C's effectiveness hinges on the security and integrity of the data it utilizes. Here are some security protocols that will be considered:

Security Protocols for Data Access
  Access Controls: A role-based access control system (RBAC) to restrict data access based on user roles and responsibilities. This ensures that only authorized personnel can access sensitive information.
  Data Encryption: Encrypting data at rest and in transit to safeguard it from unauthorized access, even in case of a security breach.
  Audit Trails: Maintaining comprehensive audit trails that log all user activity and data access attempts. This allows for monitoring potential security incidents and identifying suspicious behavior.
  Regular Penetration Testing: Conducting regular penetration testing to identify and address vulnerabilities in AMO-C's security infrastructure.
  Data Anonymization: Considering anonymizing or pseudonymizing data where possible to protect individual privacy, particularly for employee performance data.

Machine Learning algorithms are susceptible to inheriting biases from the data they are trained on. To mitigate this potential bias in AMO-C:

Potential Biases in Algorithms
  Data Quality and Diversity: Ensuring the training data used for AMO-C's algorithms is high-quality, unbiased, and representative of the target population. This may involve actively collecting data from diverse demographics and mitigating imbalances.
  Algorithmic Fairness: Employing fairness metrics during algorithm development to detect and address potential biases in decision-making. Techniques like fairness-aware model selection and bias mitigation algorithms can be explored.
  Human Oversight: Maintaining human oversight throughout the decision-making process. AMO-C will provide recommendations and insights, but final decisions will involve human judgment to mitigate potential biases in algorithmic outputs.
  Continuous Monitoring: Regularly monitor AMO-C's performance for signs of bias. Analyze decision-making patterns and identify any unintended consequences arising from algorithmic bias.

Training data are composed of at least one training data set. Training data sets are compiled by recording customer satisfaction ratings and associated operating status data. Said customer satisfaction ratings are generated by applying the Magic Grid formatting and system to traditional hierarchical organizations' information. More particularly, operating status data are associated with the traditional organizational health characteristics as measured by such things as employee retention. Today's workers are highly educated and highly resistant to authoritarian organizations. The present invention ameliorates this difficulty.

AI-Driven Optimization and Strategic Guidance

Building upon the foundation of a plurality of pre-defined strategic modules seamlessly integrated with a machine learning (ML) layer, the AMO-C system (hereinafter referred to as the "system") leverages advanced machine learning techniques within this layer (hereinafter referred to as the "layer"). The system is further configured to identify potential strategic options based on data analysis, in addition to integrating the pre-defined modules. This layer employs advanced machine learning techniques, such as supervised learning and reinforcement learning algorithms, to continuously learn and adapt the decision-making engine.

Data Acquisition and Integration

The system further comprises a data acquisition module (hereinafter referred to as the "acquisition module") configured to collect data from a plurality of sources, including:
  Company Input & Alternatives: The acquisition module is configured to receive pre-defined strategic options and alternative courses of action provided by senior management.
  External Data Feeds: The acquisition module is further configured to receive real-time and historical market data, competitor analysis, and industry trends through designated APIs or data pipelines.
  Deep Value CSI Data: The acquisition module is additionally configured to receive customer satisfaction performance data from a customer satisfaction measurement system (hereinafter referred to as the "CSI system"). The CSI system, in a preferred embodiment, is the Deep Value CSI system.

Deep Value CSI Integration (Essential)

The AMO-C system leverages the unique and comprehensive data set provided by the Deep Value CSI system (hereinafter referred to as the "CSI system"). The Deep Value CSI system is a flat structure and customer satisfaction measurement system that empowers workers based on fostering transformational CEO trust and is specifically designed to capture a holistic view of a company's internal dynamics. This customer satisfaction data set includes elements such as:
  Timeliness
  Cost
  Quality
  Functionality-Style-Brand By integrating data from the Deep Value CSI system, the AMO-C system gains a deeper understanding of the factors influencing customer satisfaction beyond just traditional forces. This allows the AMO-C system to:
  Identify Hidden Opportunities: By analyzing employee engagement and processing efficiency data, the AMO-C system can uncover hidden opportunities for improvement that may not be readily apparent from traditional market data.
  Predict Strategic Impact: The comprehensive data set from Deep Value CSI allows the AMO-C system to predict the potential impact of strategic decisions on both customer satisfaction and internal dynamics.
  Foster Trust and Ownership: The Deep Value CSI system, through its design principles that promote trust, empowerment, and ownership among employees, enhances the effectiveness of the AMO-C system. This is because a more engaged and empowered workforce is more likely to adapt to and implement strategic recommendations.

Advantages of Deep Value CSI Integration:
  The advantages of Deep Value CSI integration include:
  Holistic View: Provides a more comprehensive understanding of the company beyond just market data.
  Predictive Capabilities: Enables the AMO-C system to predict the impact of strategic decisions.
  Synergy with AI: The trust and ownership fostered by Deep Value CSI create a more receptive environment for AI-driven recommendations.

Strategic Level
    Challenge: Developing a strategic direction often relies on intuition and limited data. This can lead to missed opportunities and misaligned efforts across the organization.
    Solution: AMO-C, a sophisticated AI-powered framework, provides senior management with data-driven insights and strategic guidance to make informed decisions.
    By empowering senior management with a comprehensive understanding of internal dynamics and data-driven insights, AMO-C facilitates the development of a clear strategic direction, maximizing alignment and minimizing missed opportunities.
AI-Driven Optimization and Strategic Guidance:
    The core functionality of the AMO-C system (hereinafter referred to as the "system") resides in the integration of a plurality of pre-defined strategic modules (hereinafter referred to as "modules") with a machine learning (ML) layer (hereinafter referred to as the "layer"). Notably, the system is further configured to identify potential strategic options based on data analysis, expanding beyond the mere integration of pre-defined modules. This layer leverages advanced machine learning algorithms, such as supervised learning and reinforcement learning, to continuously learn and adapt the decision-making engine.
    A crucial component for achieving a comprehensive understanding of the company's internal dynamics is the integration of data from the Deep Value CSI system (hereinafter referred to as the "CSI system"). The Deep Value CSI system is a customer satisfaction measurement system specifically designed to capture a holistic view of a company's internal landscape. This data extends beyond traditional customer satisfaction metrics and encompasses elements such as:
    Employee Engagement: Deep Value CSI measures employee sentiment, motivation, and alignment with company goals.
    Process Efficiency: The system identifies bottlenecks and inefficiencies within internal processes.
    Communication Effectiveness: Deep Value CSI assesses the effectiveness of communication channels across the organization.
    By incorporating this comprehensive data set from the Deep Value CSI system, the AMO-C system acquires a significantly deeper understanding of the factors influencing customer satisfaction. This enhanced understanding empowers the AMO-C system to:
    Identify Hidden Opportunities: The system can analyze employee engagement and process efficiency data to uncover hidden opportunities for improvement that may not be readily apparent from traditional internal data.
    Predict Strategic Impact: The comprehensive data set from Deep Value CSI allows the AMO-C system to predict the potential impact of strategic decisions on both customer satisfaction and internal dynamics.
Advantages of Deep Value CSI Integration:
    Holistic Understanding: Provides a more comprehensive view of the company by incorporating internal dynamics data.
    Predictive Capabilities: Enables the AMO-C system to predict the impact of strategic decisions.
" ",
Product Lifecycle Management with AMC and the Evolving Algorithm Architecture:
    The Assisted Management and Operations Copilot (AMO-C) Oversight System will incorporate a dynamic learning capability to adapt its decision-making algorithms and business rules based on the specific product lifecycle stage. This ensures optimal performance throughout the product journey:
Introduction Stage:
    Agile Experimentation: During the introduction stage, characterized by high uncertainty and rapid iteration, AMO-C will prioritize algorithms focused on:
        Market response analysis: Analyzing Deep Value CSI data to understand customer sentiment and identify areas for product improvement.
        Adaptive pricing strategies: Recommending dynamic pricing models to optimize market penetration and profitability.
        Targeted marketing optimization: Utilizing customer data to identify and target high-value customer segments for marketing campaigns.
        Low volume implementation and uncertainty: The Introduction Stage of the product lifecycle is characterized by limited product availability and a high degree of unknown customer preferences. AMO-C prioritizes algorithms to address this uncertainty by analyzing market response and recommending data-driven approaches to pricing, marketing, and product improvement based on limited initial data.
Growth Stage:
    Scalability and Efficiency: As the product enters the growth stage, the AMO-C will shift its focus to algorithms that promote:
        Production optimization: Utilizing real-time data to streamline production processes and resource allocation.
        Supply chain management: Optimizing inventory levels and supplier relationships to ensure efficient product delivery.
        Demand forecasting: Leveraging Machine Learning models to anticipate future demand and adjust production schedules accordingly.
Maturity Stage:
    Maintaining Market Share: In the maturity stage, the AMC will prioritize algorithms geared toward:
        Customer retention strategies: Analyzing customer behavior patterns to identify potential churn and recommend targeted retention programs.
        Product lifecycle extension: Identifying opportunities for product innovation or diversification to extend the product's lifecycle.
        Cost optimization: Utilizing data analytics to identify cost-reduction opportunities within the production and marketing processes.
Ultimate Autonomous Management and Operations-Autopilot (AMO-A):
    The concept of AMO-A represents a potential future state where, having accumulated extensive product lifecycle data, it could transition to a more autonomous and directive approach (AMO-A). This "autopilot" mode would be particularly suitable for mature products with established markets and predictable demand patterns. By leveraging its vast knowledge, AMO-A could potentially optimize production processes, reduce operational costs, and ensure consistent product quality.
    The Assisted Management Copilot (AMO-C) represents a transformational approach to business management, leveraging the power of AI and Deep Value CSI data to optimize operations across all levels. This disclosure describes the various functionalities of AMO-C, highlighting its potential to:

Support strategic decision-making: By analyzing vast amounts of data and offering informed recommendations, AMO-C empowers senior management to chart the course for future success.

Empower MBU Leaders: Real-time data insights, intelligent work management, and continuous improvement tools enable MBU Leaders and teams to make data-driven decisions and optimize their performance.

Adapt to the Product Lifecycle: AMO-C's dynamic algorithm architecture allows it to tailor its decision support to the specific needs of each product stage, from market penetration to customer retention.

The Future . . . Autonomous Management:

The concept of the Ultimate Autonomous Management and Operations Autopilot (AMO-A) hints at the potential for even more autonomous decision-making in the future. As AMO-C accumulates data and experience, it may transition to a more autonomous role, particularly for mature products with established markets. (Ed this is a repeat of above)

However, it is important to remember that AMO-C is a powerful tool, not a replacement for human expertise and judgment. The ideal scenario involves a collaborative partnership between humans and AI, leveraging the strengths of both to achieve optimal business performance.

In conclusion, AMO-C offers a compelling vision for the future of business management. By combining empowered workers, the power of AI with the insights of Deep Value CSI, AMO-C has the potential to revolutionize how organizations operate, optimize decision-making, and achieve sustainable success.

The present invention creates images by: implementing an expanded definition of a customer-centric approach to include internal as well as external customers; displaying Micro Business Units (MBU) with horizontal organizational structures; and processing data with grid and spine flow analysis.

The present invention focuses on the business entity rather than technological innovation. More specifically, the present invention identifies Micro Business Units (MBU's); determines the customer and supplier relationship for each MBU; assesses customer satisfaction (CS) and innovation ratings for each MBU; performs a grid flow analysis; and displays a map. The present invention not only addresses the root cause of a broad spectrum of business problems being hierarchical organizations but also offers a solution.

The present invention discloses horizontal organizations are possible by implementing a SaaS/AI platform along with associated new processes. The present invention allows the user to drive the concept of Customer Satisfaction and Innovation back into the entire organization and the incredible capabilities they enable. The associated new processes are made possible by a transformational MGFA platform.

Advantages of the Present Invention

Thus, there is a need to overcome structural flaws of relic hierarchical; diminishing worker/management issues; accelerates early problem identification; contributes to innovation and unlocks value.

Deep Value CSI focuses on replacing hierarchical organizations with a flat, trust-based structure that empowers workers. This approach unlocks dramatic hidden people value, typically resulting in scalable savings of $50-70 million annually per 3,000 employees. Importantly, being people related, 30% of these savings are attainable even before work begins.

An overview of how the current invention works:

Focus on trust and empowerment: Deep Value CSI flips the script on traditional hierarchical organizations where workers rely on approval from above. It fosters a culture of trust and empowers workers in Micro Business Units (MBUs) to make decisions and drive results.

MBUs as the building blocks: The core unit of Deep Value CSI is the MBU. These can be individuals or teams acting as both internal suppliers and customers to each other. This internal customer focus ensures everyone understands how their work impacts others.

Performance through satisfaction: Customer satisfaction becomes a key metric within the organization, not just for external customers. MBUs receive satisfaction ratings based on factors like timeliness, cost, and quality.

Innovation through incentives: Deep Value CSI addresses potential limitations of flat structures (fewer promotions) by offering significant financial rewards for innovation. This incentivizes workers to continuously improve processes and find new ways of working.

Transparency and visibility: Deep Value CSI utilizes "vivid spreadsheet heat maps" to provide the CEO with real-time insights into performance and innovation across all MBUs. "Vivid" in this context refers to chroma or intensity of the display; i.e., a hue and saturation markedly contrasting against the background, as known in the art, so as to catch the attention of a CEO or designated person responsible for monitoring. Examples of vivid colors include hex code #F70D1A (vivid red) and #4169E1 (royal blue). In addition, or alternatively, the heat map may flash or pulse.

AI: For AI it's like freeing a Ferrari from a cow pasture—its full potential is unleashed simply by removing the lethargic constraints of traditional authoritarian structures.

Overall, Deep Value CSI aims to create a more agile, innovative, and results-oriented work environment by empowering workers and fostering a culture of trust and collaboration. Deep Value CSI isn't just about transforming businesses, it's about transforming lives. By empowering workers and fostering a culture of ownership, we unlock not just financial value, but also the human potential that leads to greater fulfillment and happier lives.

In sum, the present invention discloses a method which addresses the exponential complexity of displaying/communicating in horizontal organizations and the minimization it creates of upward mobility.

DETAILED DESCRIPTION OF THE INVENTION

The present invention is adapted to improving organizations by applying artificial intelligence to organizational structures which have been reformatted in accordance with the Deep Value CSI system. In one embodiment of the present invention a manager is responsible for managing a sales employee (whose duty is to sell product to customers) and a product employee (whose duty is to buy product and deliver said product to customers).

Figure 5:
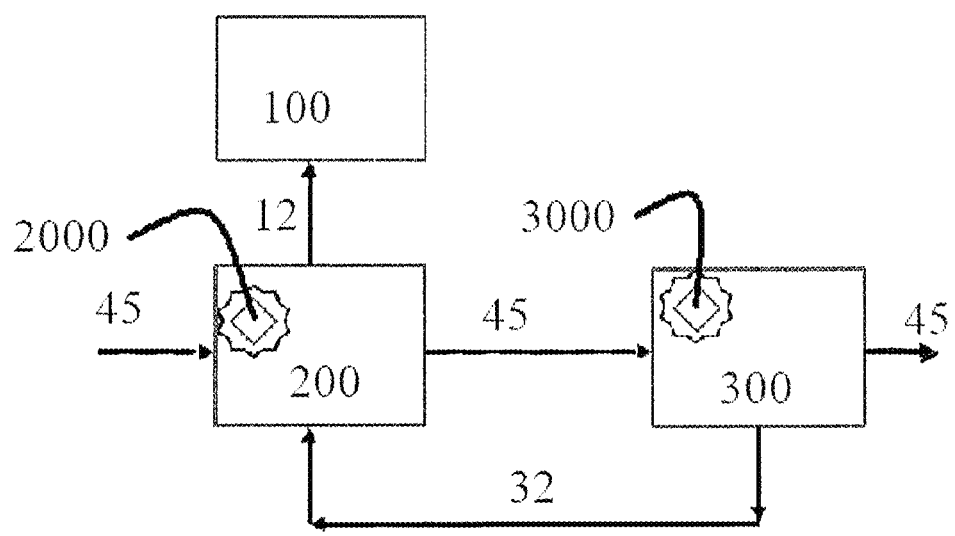
FIG. 5 illustrates the hierarchical structure from FIG. 1 adapted by Deep Value CSI to form a flat (non-hierarchical) structure with additional references to product flow, evaluations, decisions and guidelines

This organization may be memorialized in a hierarchal organizational chart format. Now referring to FIG. 1 which discloses a manager (1), a sales employee (2) and a product employee (3), as well as evaluation information flow (12) and evaluation information flow (12). The present invention teaches the adaptation of the Magic Grid to AI. As part of the adaptation, manager (1) who is converted to coach (1) must prepare guidelines which limit decisions by other members of the organization such as employees (100) and (200). Such guidelines are specific instructions to limit the decisional options for said employees. The instructions may be informational or technical. For example, the guidelines may limit the authorization of said employees to overtime of four hours a day. In this way the employee has the flexibility of working zero to four overtime hours a day. Thus, the manager (1) has become a coach (1) by allowing the employee to make decisions rather than dictating outcomes to employees. See FIG. 5, reference nos. 2000 and 3000 illustrating limited decision-making as applied to the invention through the guidelines.

In a hierarchy structure, manager (1) is responsible for evaluating sales employee (2) and product employee (3). The flow of said evaluation is from Manager (1) to sales employee (2) and is identified as evaluation information flow (12). The flow of said evaluation is from Manager (1) to product employee (3) and is identified as evaluation information flow (13).

Figure 1:
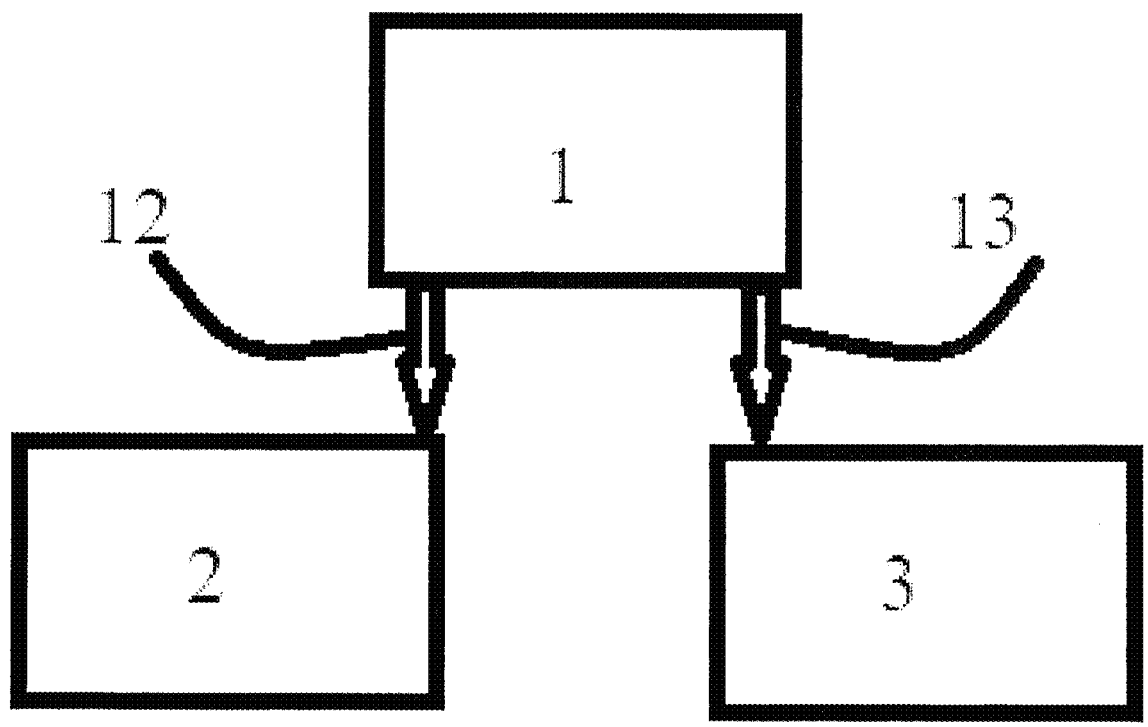
FIG. 1 depicts hierarchical structures in accordance with the teaching of the current disclosure.
Figure 2:
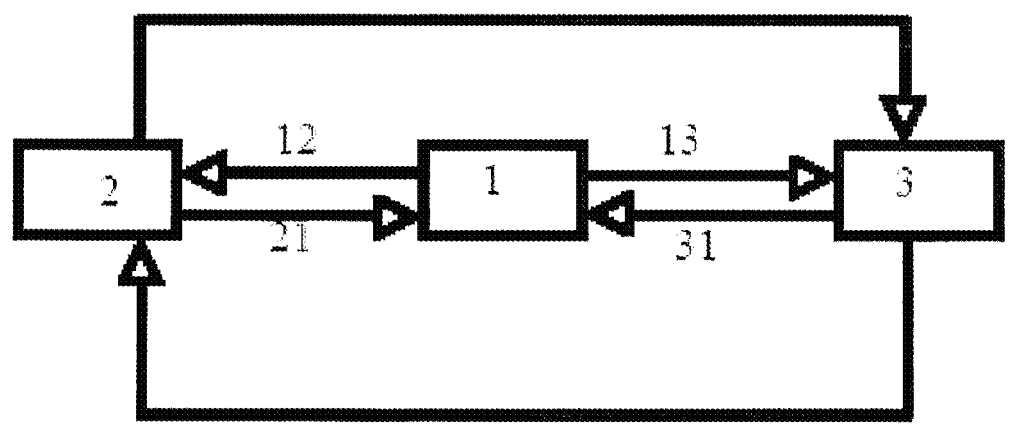
FIG. 2 depicts the hierarchical structures of FIG. 1 adapted by Deep Value CSI in a flattened (non-hierarchical) structure.

The hierarchal organizational chart format disclosed in FIG. 1 may be reformatted in accordance with the Deep Value CSI system. Now referring to FIG. 2 which discloses a manager (1), a sales employee (2) and a product employee (3), as well as evaluation information flow (12) and evaluation information flow (13). Additionally, the Deep Value CSI system results in four other evaluation information flows, namely: sales employee (2) provides evaluation information flow (23) regarding product employee (3); sales employee (2) provides evaluation information flow (21) regarding manager (1); product employee (3) provides evaluation information flow (32) regarding sales employee (2); and product employee (3) provides evaluation information flow (31) regarding manager (1). It should be noted that manager (1), sales employee (2) and product employee (3) are each Micro Business Units Node network entities.

The evaluation information flow is a set of MBUs' performance results. Said results may be as simple as satisfactory or not satisfactory. However, a set MBUs' performance results incorporating the rating system as disclosed above is generally more desirable.

Figure 3:
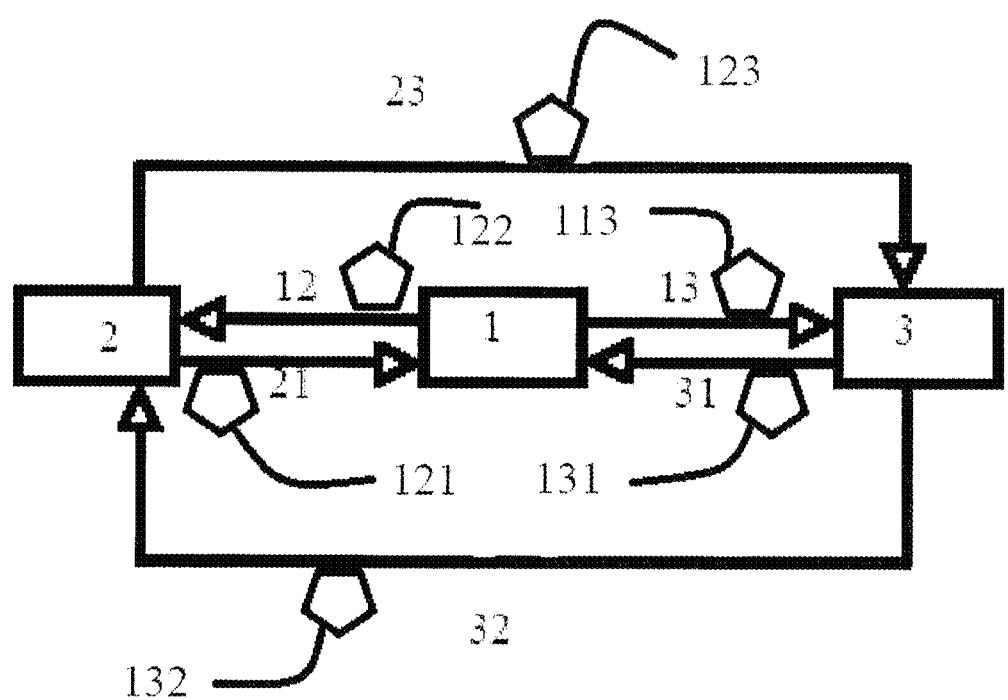
FIG. 3 depicts an embodiment of the present invention adapted to the structure disclosed in FIG. 2.

The present invention detects, records and communicates evaluation information flows by incorporating an information flow communication detection and communication means between each Micro Business Units Node network entity. Now referring to FIG. 3. Device 112 (112) is adapted to detect, record and communicate information flow between Manager (1) and sales employee (2); Device 113 (113) is adapted to detect, record and communicate information flow between Manager (1) and product employee (3); Device 121 (121) is adapted to detect, record and communicate information flow between sales employees (2) and Manger (1); Device 123 (123) is adapted to detect, record and communicate information flow between sales employees (2) and product employee (3); Device 131 (131) is adapted to detect, record and communicate information flow between product employee (3) and manager (1); and Device 132 (132) is adapted to detect, record and communicate information flow between product employee (3) and sales employee (2).

Said means may be devices adapted to detect, record and communicate messages between people disclosed on the organization chart, such as a wiretap on phone lines between phones operated by people disclosed on the organization chart. Other means may be Application Programming Interfaces configured to collect data and publish reports relating to the set of Micro Business Units Node network entities.

Upon receipt of said evaluation information flow said information is provided to a set of Artificial Intelligence (AI)-based learning models, wherein at least one member of the set of AI-based learning models is trained on a training data set of a set of Micro Business Units performance results operating data to classify the evaluation information flow as at least one of: an operating state (i.e., no change in the process need be considered) or an error condition (i.e. at least one change in the process should be evaluated) of at least one Micro Business Units Node entity of the set of Micro Business Units Node network entities.

In the event an error condition is detected by the AI, then the AI determines the potential risk of the error condition to Micro Business Units Node based upon, at least in part, an output of the AI-based learning classification of the at least one of: an operating state or an error condition.

If the AI communicates a proposed action to mitigate the potential risk in the Micro Business Units Node network. The proposed actions are recommended changes to the organization. For example, if both the manager (1) and sales employee (2) evaluate product employee (3), then the AI may communicate to manager (1) that product employee be replaced.

A. An example of training data comprising a history of an organization's deep value customer satisfaction ratings (i.e. as generated by the Deep Value CSI system based on Magic Grid formatting) and associated operating status data of said organization might be three months of weekly lists of all organization's deep value customer satisfaction ratings, wherein said weekly lists with three months of weekly lists of said organization's health measure such as said organization's liquidity, solvency, operating efficiency, profitability, employee turnover, and absenteeism. An example of a value that indicates that an alarm should be triggered for a specific satisfaction rating (e.g., 6 or below as a customer satisfaction rating based on the Magic Grid format).

An alarm refers to a message generated by the AI element of the present invention directed to at least one member of the organization pertaining to the application of the invention. Said alarm was created as a result of the machine-learning element changing one or more weights or nodes in the artificial neural network. For example, if the Deep Value customer-satisfaction rating is generated and found to be suboptimal, a sensor will communicate said suboptimal information to the machine-learning element of the AI, and the machine-learning element will trigger a message to the generative element of the AI to send an alarm. Said alarm may be tangible; e.g., vibrating or audible. In an embodiment, said tangible alarm may vary in intensity (e.g., frequency of vibrations or sound) in step with or proportional to the degree of suboptimal performance detected. The present invention is adapted to incorporate audible alarms including piezo buzzers, music alarms, electronic and motor driven sirens including a number of sounders with adjustable volume, selectable tone outputs, and mounting options. The present invention is adapted to incorporated machinery formulated to comply with MIL-A-15303 standards for audible signals: alarms, bells, buzzers, horns.

B. Preparation for Data Collection—Objective: Replace Hierarchical Business Structures with a Horizontal (flatter) "Empowerment System" that is especially necessary for workers in an AI environment.

Preparation for Data Collection—Empowerment System: All these steps are necessary to replace hierarchical organizations and to capture the data necessary for advanced AI analysis . . . replacing hierarchies is complex:

1. Create Micro Business Units (MBUs): these represent every function within the company.
2. Identify the leader for each MBU. If there is more than one member of the MBU they would generally be someone in training or else a new empowered MBU is created.
3. CEO gives approval to empower MBU leaders. This is the critical Trust needed for the new system to be successful. This trust is the foundation of everything. We are creating a new type of leadership. Empowerment is the key for long-term Agile success.
4. New processes and an empowerment management philosophy. For examples each MBU will be a supplier as well as a customer. Supplier MBUs will provide their output to customer MBUs. In turn, customer MBUs will give supplier MBUs numeric customer satisfaction ratings. Customer satisfaction elements will include Timelines, Cost, Quality, Functionality and whatever other may be appropriate.
5. MBUs will not report to managers but will be evaluated based on their customer satisfaction results . . . on performance. Work will now be based on results. This significantly reduces politics. It will also change the work from home discussion. The decision to work from home, the office or a hybrid will shift from a global CEO decision to a local decision made by each MBU based on satisfying their customer.
6. Management levels will be reduced by 40-60%. This will reduce career paths and foster workers to become masters of their craft. To compensate for this change in career path, rewards will be given for innovation . . . something in the range of 10% of the savings.
7. Previous first line managers will now become coaches ensuring MBUs have all the resources necessary to perform their function. This in turn will minimize micromanaging.
8. Proprietary technology will capture every MBU (node) and, through a proprietary approach interconnect each MBU and build vivid displays to show the status of the business.
9. Vision, strategy and goals interpreted by the coach for each MBU with preset management guidelines.

Preparation Summary: All the foregoing is necessary to create the base data to enable a System and Method for Using Artificial Intelligence to Identify and Respond to Information from Non-hierarchical Business Structures.

C. There are numerous Systems and Methods for using Artificial Intelligence to Identify and Respond to information from a non-hierarchical business structure called Deep Value CSI. Four specific examples include:

Example 1—A computer-implemented method comprising receiving information, providing information to learning models, determining risks, executing actions which flag and/or gate outputs:

a. Receiving information:
   Receiving, by a computing device, information associated with a set of Micro Business Units performance results of Micro Business Unit Network Nodes, the information generated by at least one of: a set of message from the set of Micro Business Unit Nodes network entities or a set of Application Programming Interfaces configured to collect data and publish reports relating to the set of Micro Business Units Node network entities;
b. Providing information to learning models:
   providing the information to a set of Artificial Intelligence (AI)-based learning models, wherein at least one member of the set of AI-based learning models is trained on a training data set of a set of Micro Business Units performance results operating data to classify at least one of: an operating state or an error condition of at least one Micro Business Units Node entity of the set of Micro Business Units Node network entities;
c. Determining risks:
   determining a potential risk in the Micro Business Units Node based upon, at least in part, an output of the AI-based learning classification of the at least one of: an operating state or an error condition and
d. Executing actions:
   executing an action such as gating to mitigate the potential risk of the Micro Business Units Node to the network. The computer-implemented method of Claim 1, wherein executing the action to mitigate the potential risk in the Micro Business Units Node network includes flagging the potential risk in the Micro Business Units Node network.
   The computer-implemented method of Claim 1, wherein executing the action to mitigate the potential risk in the Micro Business Units Node network includes responding to the potential risk in the Micro Business Units Node network by gating its output to prevent contaminating subsequent nodes (MBUs).

Example 2—A computer-implemented method comprising receiving internal Deep Value CSI and identified external information, providing this information to learning models, determining risks, executing actions the result of analyzing MBU performance will track through Magic Grid node connectivity for customer satisfaction identify/point to the potential root cause of problems flagged by red (6 or below in customer satisfaction ratings) performing MBU.

a. Receiving information:
   i. Receiving, by a computing device, internal Deep Value CSI data associated with a set of Micro Business Unit (MBU) performance results of Micro Business Unit Network Nodes, and
   ii. Receiving, by the computing device, identified external data associated with customer satisfaction of the set of Micro Business Unit Network Nodes.

b. Providing information to learning models:
   Providing the internal Deep Value CSI data and the identified external data to a set of Artificial Intelligence (AI)-based learning models, wherein at least one member of the set of AI-based learning models is trained on a training data set comprising historical Deep Value CSI data and historical customer satisfaction data to:
   i. Classify an operating state of at least one Micro Business Unit Node entity of the set of Micro Business Unit Network Nodes, and
   ii. Identify a potential root cause of a customer satisfaction issue based on the Magic Grid MBU node connectivity and flagged problems.
c. Determining risks:
   Determining a potential risk to customer satisfaction in the Micro Business Unit Network based upon, at least in part, an output of the AI-based learning models, wherein the output identifies:
   i. An MBU Node entity with a flagged customer satisfaction rating (e.g., red, or 6 or below), and
   ii. A potential root cause of the flagged customer satisfaction rating based on the Magic Grid MBU node connectivity.
d. Executing actions:
   Executing an action to mitigate the potential risk to customer satisfaction in the Micro Business Unit Network, wherein the action comprises:
   i. Identifying the MBU Node entity with the flagged customer satisfaction rating, and
   ii. Identifying the potential root cause MBU(s) based on the Magic Grid MBU node connectivity.

Example 3—A computer-implemented method comprising receiving internal Deep Value CSI and identified external information, providing this information to learning models, determining risks, executing actions the result of analyzing MBU numerical customer satisfaction in total and by each element of customer satisfaction for Timeliness, Cost, Quality, Functionality and Other quantitative data along with other external financial data to determine if there is a predictive time delay correlation correspondence to profitability and other financial indicators.

a. Receiving information:
   Receiving, by a computing device, information associated with a set of MBU performance results and identified external data, including:
   i. MBU performance results comprise summation of numerical customer satisfaction data including one, more or all of: timeliness, cost, quality, functionality and other.
   ii. Identified external financial data.
b. Providing information to learning models:
   Providing this information to a set of Artificial Intelligence (AI)-based learning models, wherein at least one member of the set of AI-based learning models is trained on a training data set comprising historical Deep Value CSI customer satisfaction data and historical external financial data to identify:
   c. Determining risks:
   i. Evaluate if there are predictive time delay correlations between wide array of numerical Deep Value CSI MBU customer satisfaction data combinations along with external financial indicators to profitability.
d. Executing actions:
   i. Making potential forecasts to project future profitability at an earlier timeframe.
   ii. Making recommendations as to changes in strategy and operations.

Example 4—Predictive Deep Value CSI AI for Business Vision and Strategy a. Receiving Information:
   The computer system receives information from multiple sources:
   i. MBU Customer Satisfaction Results: This data comes from Deep Value CSI and details customer satisfaction across various elements within each MBU.
   ii. External data sources containing information relevant to various strategic analysis frameworks [e.g. Five Forces Analysis SWOT Analysis, VRIO Framework (Valuable, Rare, Inimitable, and Organized), Scenario Planning, Big Data Analytics and more].
b. Providing Information to Learning Models:
   The system feeds the received information into a set of AI-based learning models. These models are specifically designed for:
   i. Understanding a company's strengths and weaknesses: The models are trained on historical Deep Value CSI data to analyze MBU customer satisfaction results and identify patterns that reveal a company's strengths and weaknesses across various elements (e.g., timeliness, cost, quality, functionality and other).
   ii. Understanding External Strategic Approaches: The models are trained on a broad array of key external strategic analysis frameworks (above) to comprehend the competitive landscape and relevant external factors.
   iii. Accessing External Data Sources: The system retrieves and provides relevant external data sources to the learning models to supplement their analysis of the company's environment.
c. Determining Risks:
Based on the combined analysis of internal (customer satisfaction) and external data, the AI models identify potential risks and opportunities for the company. This may include:
   i. Strategic Weaknesses: Identifying areas where the company might be vulnerable due to internal weaknesses or external threats.
   ii. Missed Opportunities: Highlighting areas where the company could capitalize on strengths or favorable external conditions.
a. Executing Actions:
The system leverages the AI analysis to support strategic decision-making through an interactive process:
   i. Developing Business Vision and Strategy: The AI generates strategic recommendations based on the analysis, which can be interactively explored and refined by management to create a final vision, strategy, and goals for the company.
   ii. Communicating Strategy to MBUs: Once management approves the final strategy, the AI interprets the implications for each MBU and communicates this information to the respective units. This may involve tailoring action plans or focusing resources based on identified strengths, weaknesses, opportunities, and threats.

Figure 6:
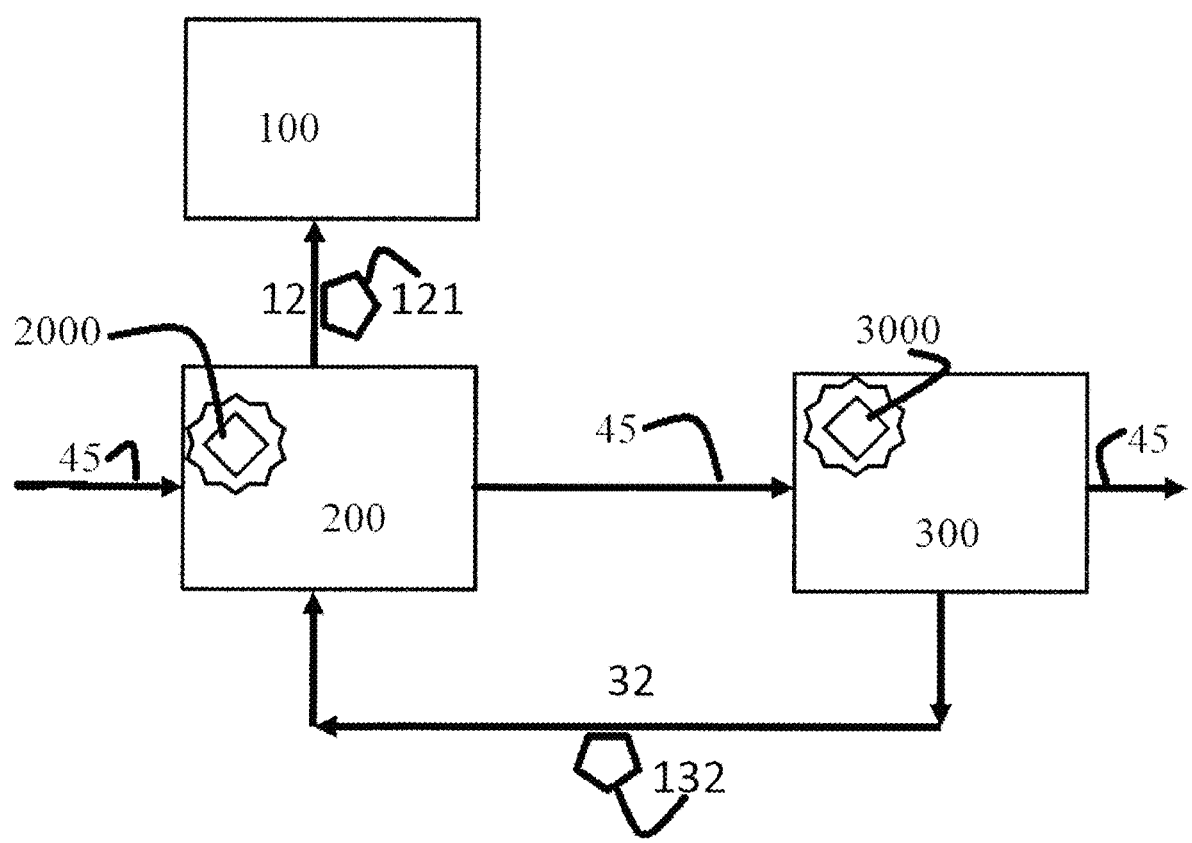
FIG. 6 depicts an embodiment of the present invention adapted to the structure disclosed in FIG. 2, with additional references to product flow, evaluations, decisions and guidelines

In another embodiment of the present invention, the present invention a manager is responsible for managing a manufacturing employee whose duty is to build a subassembly. This subassembly, when complete is moved to another employee who combines this subassembly with other subassemblies to make a finished product. Now referring to FIGS. 4, 5 and 6 which each include additional references to product flow, evaluations, decisions and guidelines.

This organization may be memorialized in a hierarchal organizational chart format. Now referring to FIG. 1 which discloses a manager (100), a first manufacturing employee (200) and a second manufacturing employee (300). It also shows evaluation 12. In a hierarchy structure, manager (100) is responsible for evaluating manufacturing employee (200). The flow of said evaluation is from Manager (100) to sales employee (200) and is identified as evaluation information flow (12). It also shows that decisions (1000) are made by manager (100). The flow of product, the arrows (45), is from manufacturing employee (200) to manufacturing employee (300).

Figure 4:
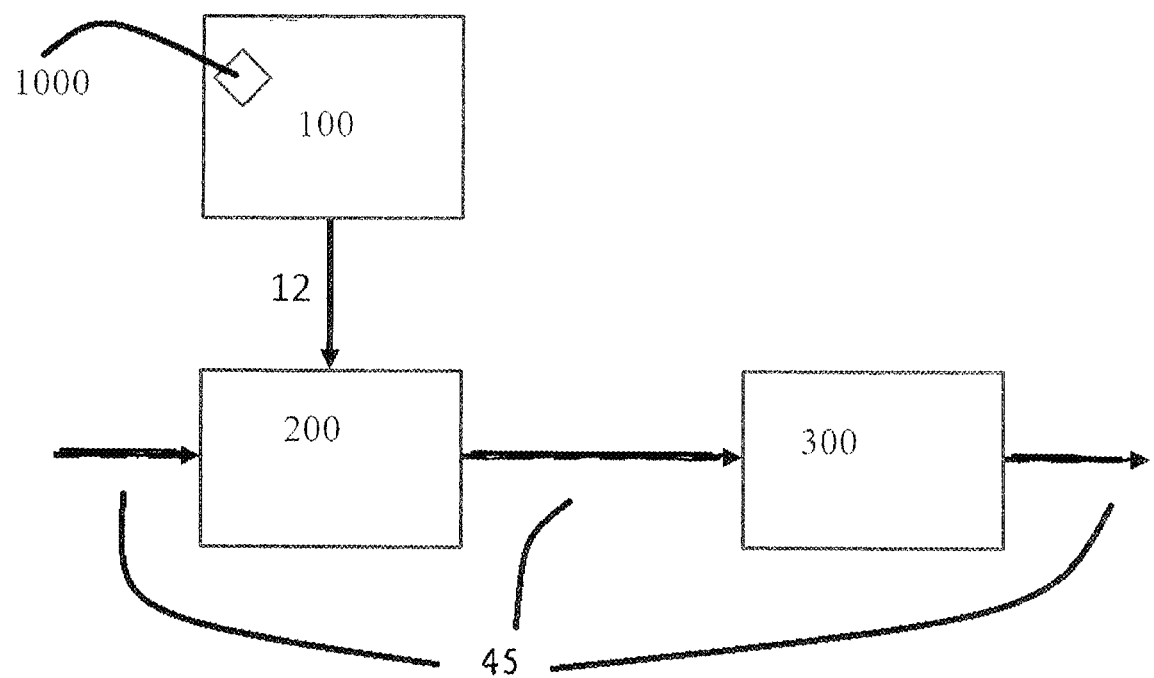
FIG. 4 depicts a hierarchical structure with additional references to product flow, evaluations, decisions and guidelines

The hierarchal organizational chart format disclosed in FIG. 4 may be reformatted in accordance with the Deep Value CSI system. Now referring to FIG. 5 which discloses that manager (100) has now become coach (100), a manufacturing employee (200) and manufacturing employee (300). It also shows information flow (12) as well as new evaluation information flow (32). However, in Deep Value CSI environment decision making has moved from manager (100) now called coach (100) to empowered manufacturing employee (200). But there are decision making guidelines (2000) established for manufacturing employee (200). In addition, manufacturing employee (200) will be evaluating coach (100) based on how well coach (1) communicates corporate vision, strategy and goals and provides the training and support needed by employee (200). The product flow is from now from "supplying" manufacturing employee (200) to "customer" manufacturing employee (300). "Customer" manufacturing employee (300) will like "Supplier" manufacturing employee (200) also be empowered to make decisions (3000). "Customer" manufacturing employee (300) will as a customer evaluate its "supplying" manufacturing employee (200) as indicated by the new evaluation (32). This evaluation will be a multi-dimensional evaluation based on items like timeliness, cost, quality, functionality and other as appropriate. "Customer" manufacturing employee (300) adds "supplying" manufacturing employee's (200) subassembly to other components to create a product. "Supplying" manufacturing employee's (300) (formerly customer employee 300) then moves the product to the next employee in the process and in doing so, evolves from a being a "customer" to becoming a "supplier." Now as a "supplier" (300) subsequently will receive evaluations from its "customer" manufacturing employee not shown in FIG. 2. Every worker assumes the role of supplier who must satisfy the needs of its customer . . . it must get to know its customer.

It should be noted that coach (100) "supplying" manufacturing employee 200 (200) and "customer" manufacturing employee 300 (300) are each Micro Business Units (MBU) Node network entities.

The evaluation information flow is a set of Micro Business Units performance results. Said results may be as simple as satisfactory or not satisfactory as disclosed in the prior embodiment noted above. However, a set Micro Business Units performance results incorporating the rating system as disclosed above is generally more desirable.

The present invention uses sensors (devices, for example references 121 and 132 in FIG. 6) to detect, record, and communicate evaluation information flows by incorporating an information flow communication detection and communication means between each Micro Business Units Node network entity. Now referring to FIG. 6, Device 121 (121) is adapted to detect, record and communicate information flow between "supplying" manufacturing employee 200 (200) and Coach (100); Device 132 (132) is adapted to detect, record and communicate information flow between "customer" manufacturing employee 300 (300) "supplier" manufacturing employee (200). It also shows that limited decisions (2000) are made by employee (200), which are limited by guidelines. Said guidelines are advice and information dictated by the organization related to the decision options available to employee 200 (200). Similarly, it shows that limited decisions (3000) are made by employee (300) which are limited by guidelines. Said guidelines consist of advice and information dictated by the organization related to the task the employee is executing.

Said means may be devices adapted to detect, record and communicate messages between people disclosed on the organization chart, such as a wiretap on phone lines between phones operated by people disclosed on the organization chart. Other means may be Application Programming Interfaces configured to collect data and publish reports relating to the set of Micro Business Units Node network entities.

Upon receipt of said evaluation information flow said information is provided to a set of Artificial Intelligence (AI)-based learning models, wherein at least one member of the set of AI-based learning models is trained on a training data set of a set of Micro Business Units performance results operating data to classify the evaluation information flow as at least one of: an operating state (i.e. no change in the process need be considered) or an error condition (i.e. at least one change in the process should be evaluated) of at least one Micro Business Units Node entity of the set of Micro Business Units Node network entities.

In the event an error condition is detected by the AI, then the AI determines the potential risk of the error condition to Micro Business Units Node based upon, at least in part, an output of the AI-based learning classification of the at least one of: an operating state or an error condition.

If the AI communicates a proposed action to mitigate the potential risk in the Micro Business Units Node network. The proposed actions are recommended changes to the organization. For example, AI detects a significant performance issue at device 132 (132) it could notify subsequent Nodes of the issue and to recommend action. If the issue is catastrophic it could not only notify subsequent nodes but take a gating action and shut down production at all appropriate nodes.

Figure 7:
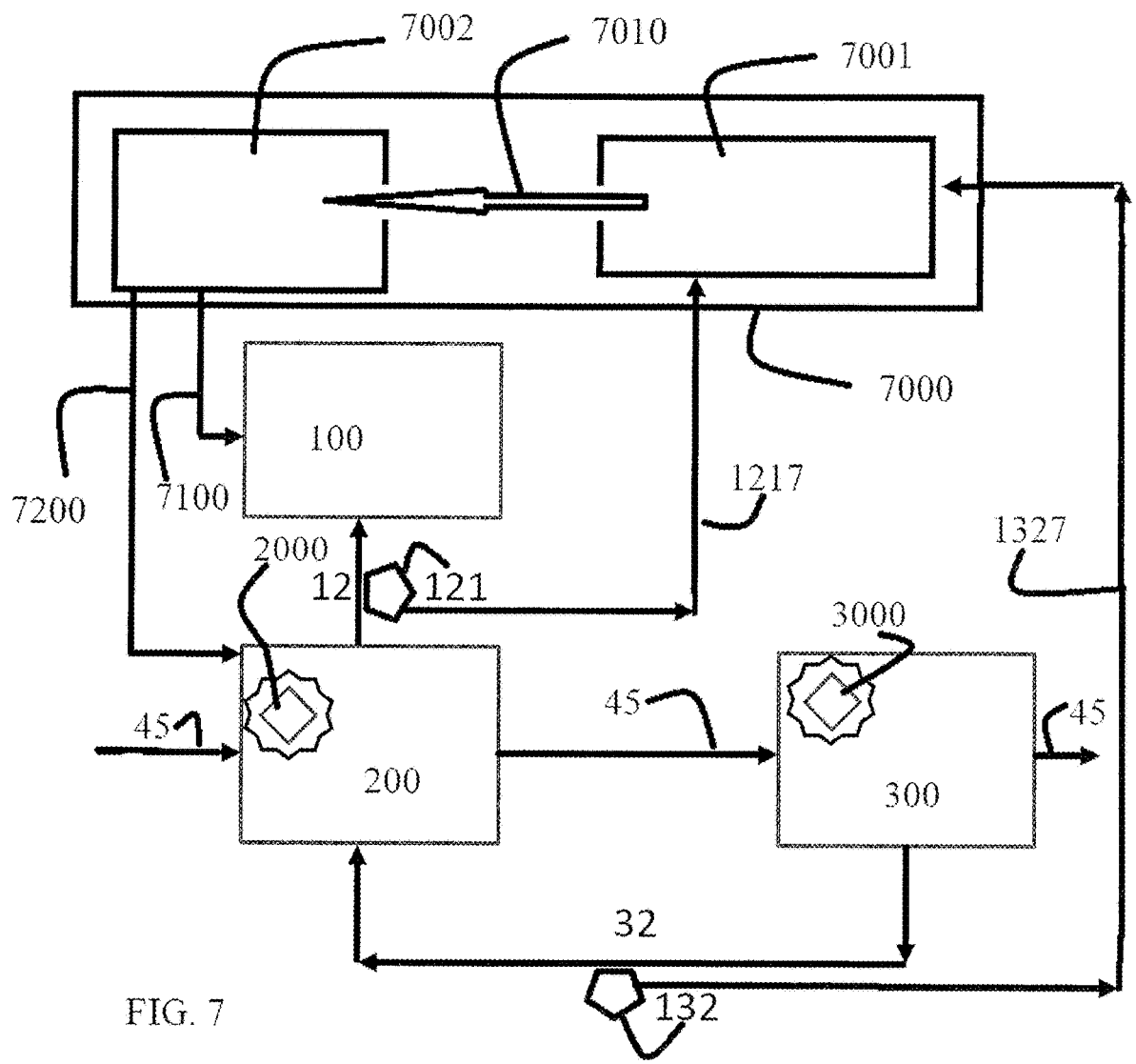
FIG. 7 depicts artificial intelligence communication pathways for the present invention.

Now referring to FIG. 7 which displays the communication among the Artificial Intelligence (AI) elements of the present inventions, namely the computer (7000) which run the Learning Machine element (7001) and the Generative Artificial Intelligence element (7002) of the present invention, the sensors devices (121 and 132). FIG. 7 displays several communication paths including, message stream 1327 (1327) whereby device 132 (132) communicates information and content of message stream (32) with the Machine Learning element (7001) located in computer (7000); message stream 1217 (1217) whereby device 121

(121) communicates information and content of message stream (12) with the Machine Learning element (7001) located in computer (7000).

Upon receiving data via message stream 1327 (1327) and via message stream 1217 (1217) run the Learning Machine element (7001) generates and updates algorithms related to improving the functioning of the organization to which the present invention has been adapted. Said algorithms are communicated to the Generative Artificial Intelligence element (7002) via a communication stream (7010). Upon receiving data via said communication stream (7010), the Generative Artificial Intelligence element (7002) sends coach (100) and employee (200) information. Communications between the Generative Artificial Intelligence element (7002) and coach (100) are via data stream 7'00 (7100) and communications between the Generative Artificial Intelligence element (7002) and employee 200 (200) are via data stream 7100 (7100).

To capture data, devices are placed throughout the Deep Value CSI network. In FIG. 7 there are two devices. Device (132) that capture numerical customer satisfaction data. This data reflects how satisfied manufacturing employee (300) is on a spectrum of measured elements with the work performance (results) of manufacturing employee (200). Device (132) transmits these results to the AI computer (7000). The AI computer (7000) is composed of a machine learning (ML) sector (7001) and a Generative AI sector (GAI) (7002). The ML sector (7001) will receive this input and combine it with other internal and external data in a learning process and output its findings to the GAI sector (7002). The GAI sector (7002) will analyze this input along with other intelligence and make recommendations back to manufacturing employee (200). Manufacturing employee (200) can then make decisions, within predefined guidelines, or they can dialog with the GAI (7002) for clarifications and enhancements to make even more informed decisions. GAI (7002) is becoming a copilot for manufacturing employee (200). Over time as it gets to know manufacturing employee (200), corporate direction and outside elements it will help manufacturing employee (200) make even better decisions. GAI (7002) will also start recommending process improvements to manufacturing employee (200) which, if accepted by management, will provide manufacturing employee (200) with financial rewards.

A similar process will take place between manufacturing employee (200) and coach (100). Device (121) will capture feedback from manufacturing employee (200) to coach (100) that captures how satisfied manufacturing employee (200) is with coach (100's) coaching in providing the necessary resources and explaining the company's vision, strategy and goals of the company and interpreting how they apple to manufacturing employee (200). Device (121) will then transmit these findings to the ML sector (7001) of the AI computer (7000). This ML sector (7001) will accept this information, compare this input with its database of information and enhance its learning capabilities. The ML sector (7001) will then pass its enhanced results to the GAI sector (7002). The GAI sector (7002) will then analyze this input, the stored corporate vision, strategy and objectives of the company along with other intelligence and make recommendations to coach (100). Coach (100) can accept, ignore or dialogue with GAI (7002) on its suggestions and then make decisions on its coaching effort. GAI (7002) is again becoming a copilot but this time for coach (100). Similar to its (7002) efforts with manufacturing employee (200) it will help make coach (100) become an even better coach for manufacturing employee (200).

A. An example of training data comprising a history of an organization's deep value customer satisfaction ratings (i.e. as generated by the Deep Value CSI system based on Magic Grid formatting) and associated operating status data of said organization might be three months of weekly lists of all organization's deep value customer satisfaction ratings, wherein said weekly lists with three months of weekly lists of said organization's health measure such as said organization's liquidity, solvency, operating efficiency, profitability, employee turnover, and absenteeism. An example of a value that indicates that said alarm should be triggered might be an alarm trigger might be a specific satisfaction rating (e.g., 6 or below as a customer satisfaction rating based on the Magic Grid format).

B. Preparation for Data Collection—Objective: Replace Hierarchical Business Structures with a Horizontal (flatter) "Empowerment System" that is especially necessary for workers in an AI environment.

Preparation for Data Collection—Empowerment System: All these steps are necessary to replace hierarchical organizations and to capture the data necessary for advanced AI analysis . . . replacing hierarchies is complex:

1. Create Micro Business Units (MBUs): these represent every function within the company.
2. Identify the leader for each MBU. If there is more than one member of the MBU they would generally be someone in training or else a new empowered MBU is created.
3. CEO gives approval to empower MBU leaders. This is the critical Trust needed for the new system to be successful. This trust is the foundation of everything. We are creating a new type of leadership. Empowerment is the key for long-term Agile success.
4. New processes and an empowerment management philosophy. For examples each MBU will be a supplier as well as a customer. Supplier MBUs will provide their output to customer MBUs. In turn, customer MBUs will give supplier MBUs numeric customer satisfaction ratings. Customer satisfaction elements will include Timelines, Cost, Quality, Functionality and whatever other may be appropriate.
5. MBUs will not report to managers but will be evaluated based on their customer satisfaction results . . . on performance. Work will now be based on results. This significantly reduces politics. It will also change the work from home discussion. The decision to work from home, the office or a hybrid will shift from a global CEO decision to a local decision made by each MBU based on satisfying their customer.
6. Management levels will be reduced by 40-60%. This will reduce career paths and foster workers to become masters of their craft. To compensate for this change in career path, rewards will be given for innovation . . . something in the range of 10% of the savings.
7. Previous first line managers will now become coaches ensuring MBUs have all the resources necessary to perform their function. This in turn will minimize micromanaging.
8. Proprietary technology will capture every MBU (node) and, through a proprietary approach, interconnect each MBU and build vivid displays to show the status of the business.
9. Vision, strategy and goals interpreted by the coach for each MBU with preset management guidelines.

Preparation Summary: All the foregoing is necessary to create the base data to enable a System and Method for Using Artificial Intelligence to Identify and Respond to Information from Non-hierarchical Business Structures.

C. There are numerous Systems and Methods for using Artificial Intelligence to Identify and Respond to information from a non-hierarchical business structure called Deep Value CSI. Four specific examples include:

Example 1—A computer-implemented method comprising receiving information, providing information to learning models, determining risks, executing actions which flag and/or gate outputs:
  b. Receiving information:
    Receiving, by a computing device, information associated with a set of Micro Business Units performance results of Micro Business Unit Network Nodes, the information generated by at least one of: a set of message from the set of Micro Business Unit Nodes network entities or a set of Application Programming Interfaces configured to collect data and publish reports relating to the set of Micro Business Units Node network entities;
  c. Providing information to learning models:
    providing the information to a set of Artificial Intelligence (AI)-based learning models, wherein at least one member of the set of AI-based learning models is trained on a training data set of a set of Micro Business Units performance results operating data to classify at least one of: an operating state or an error condition of at least one Micro Business Units Node entity of the set of Micro Business Units Node network entities;
  d. Determining risks:
    determining a potential risk in the Micro Business Units Node based upon, at least in part, an output of the AI-based learning classification of the at least one of: an operating state or an error condition and
  e. Executing actions:
    executing an action such as gating to mitigate the potential risk of the Micro Business Units Node to the network. The computer-implemented method of Claim 1, wherein executing the action to mitigate the potential risk in the Micro Business Units Node network includes flagging the potential risk in the Micro Business Units Node network.
    The computer-implemented method of Claim 1, wherein executing the action to mitigate the potential risk in the Micro Business Units Node network includes responding to the potential risk in the Micro Business Units Node network by gating its output to prevent contaminating subsequent nodes (MBUs).

Example 2—A computer-implemented method comprising receiving internal Deep Value CSI and identified external information, providing this information to learning models, determining risks, executing actions the result of analyzing MBU performance will track through Magic Grid node connectivity for customer satisfaction identify/point to the potential root cause of problems flagged by red (6 or below in customer satisfaction ratings) performing MBU.
  a. Receiving information:
    i. Receiving, by a computing device, internal Deep Value CSI data associated with a set of Micro Business Unit (MBU) performance results of Micro Business Unit Network Nodes, and
    ii. Receiving, by the computing device, identified external data associated with customer satisfaction of the set of Micro Business Unit Network Nodes.
  b. Providing information to learning models:
    Providing the internal Deep Value CSI data and the identified external data to a set of Artificial Intelligence (AI)-based learning models, wherein at least one member of the set of AI-based learning models is trained on a training data set comprising historical Deep Value CSI data and historical customer satisfaction data to:
    i. Classify an operating state of at least one Micro Business Unit Node entity of the set of Micro Business Unit Network Nodes, and
    ii. Identify a potential root cause of a customer satisfaction issue based on the Magic Grid MBU node connectivity and flagged problems.
  c. Determining risks:
    Determining a potential risk to customer satisfaction in the Micro Business Unit Network based upon, at least in part, an output of the AI-based learning models, wherein the output identifies:
    i. An MBU Node entity with a flagged customer satisfaction rating (e.g., red, or 6 or below), and
    ii. A potential root cause of the flagged customer satisfaction rating based on the Magic Grid MBU node connectivity.
  d. Executing actions:
    Executing an action to mitigate the potential risk to customer satisfaction in the Micro Business Unit Network, wherein the action comprises:
    i. Identifying the MBU Node entity with the flagged customer satisfaction rating, and
    ii. Identifying the potential root cause MBU(s) based on the Magic Grid MBU node connectivity.

Example 3—A computer-implemented method comprising receiving internal Deep Value CSI and identified external information, providing this information to learning models, determining risks, executing actions the result of analyzing MBU numerical customer satisfaction in total and by each element of customer satisfaction for Timeliness, Cost, Quality, Functionality and Other quantitative data along with other external financial data to determine if there is a predictive time delay correlation correspondence to profitability and other financial indicators.
  a. Receiving information:
    Receiving, by a computing device, information associated with a set of MBU performance results and identified external data, including:
    i. MBU performance results comprise summation of numerical customer satisfaction data including one, more or all of: timeliness, cost, quality, functionality and other.
    ii. Identified external financial data.
  b. Providing information to learning models:
    Providing this information to a set of Artificial Intelligence (AI)-based learning models, wherein at least one member of the set of AI-based learning models is trained on a training data set comprising historical Deep Value CSI customer satisfaction data and historical external financial data to identify:
  c. Determining risks:
    i. Evaluate if there are predictive time delay correlations between wide array of numerical Deep Value CSI MBU customer satisfaction data combinations along with external financial indicators to profitability.

d. Executing actions:
  i. Making potential forecasts to project future profitability at an earlier timeframe.
  ii. Making recommendations as to changes in strategy and operations.

Example 4—Predictive Deep Value CSI AI for Business Vision and Strategy a. Receiving Information:
  The computer system receives information from multiple sources:
    i. MBU Customer Satisfaction Results: This data comes from Deep Value CSI and details customer satisfaction across various elements within each MBU.
    ii. External data sources containing information relevant to various strategic analysis frameworks [e.g. Five Forces Analysis SWOT Analysis, VRIO Framework (Valuable, Rare, Inimitable, and Organized), Scenario Planning, Big Data Analytics and more].
b. Providing Information to Learning Models:
The system feeds the received information into a set of AI-based learning models. These models are specifically designed for:
  i. Understanding a company's strengths and weaknesses: The models are trained on historical Deep Value CSI data to analyze MBU customer satisfaction results and identify patterns that reveal a company's strengths and weaknesses across various elements (e.g., timeliness, cost, quality, functionality and other).
  ii. Understanding External Strategic Approaches: The models are trained on a broad array of key external strategic analysis frameworks (above) to comprehend the competitive landscape and relevant external factors.
  iii. Accessing External Data Sources: The system retrieves and provides relevant external data sources to the learning models to supplement their analysis of the company's environment.
c. Determining Risks:
Based on the combined analysis of internal (customer satisfaction) and external data, the AI models identify potential risks and opportunities for the company. This may include:
  iii. Strategic Weaknesses: Identifying areas where the company might be vulnerable due to internal weaknesses or external threats.
  iv. Missed Opportunities: Highlighting areas where the company could capitalize on strengths or favorable external conditions.
a. Executing Actions:
The system leverages the AI analysis to support strategic decision-making through an interactive process:
  i. Developing Business Vision and Strategy: The AI generates strategic recommendations based on the analysis, which can be interactively explored and refined by management to create a final vision, strategy, and goals for the company.
  ii. Communicating Strategy to MBUs: Once management approves the final strategy, the AI interprets the implications for each MBU and communicates this information to the respective units. This may involve tailoring action plans or focusing resources based on identified strengths, weaknesses, opportunities, and threats.

In another embodiment of the present invention, the present invention a manager is responsible for managing a manufacturing employee whose duty is to build a subassembly. This subassembly, when complete is moved to another employee who combines this subassembly with other subassemblies to make a finished product. Now referring to FIGS. 4, 5, and 6 which each include additional references to product flow, evaluations, decisions and guidelines.

This organization may be memorialized in a hierarchal organizational chart format. Now referring to FIG. 1 which discloses a manager (100), a first manufacturing employee (200) and a second manufacturing employee (300). It also shows evaluation (12). In a hierarchy structure, manager (1) is responsible for evaluating manufacturing employee (200). The flow of said evaluation is from Manager (100) to sales employee (200) and is identified as evaluation information flow (12). It also shows that decisions (1000) are made by manager (1). The flow of product, the arrows (45), is from manufacturing employee (200) to manufacturing employee (300).

The hierarchal organizational chart format disclosed in FIG. 1 may be reformatted in accordance with the Deep Value CSI system. Now referring to FIG. 2 which discloses that manager (100) has now become coach (100), a manufacturing employee (200) and manufacturing employee (300). It also shows information flow (12) as well as new evaluation information flow (32). However, in Deep Value CSI environment decision making has moved from manager (100) now called coach (100) to empowered manufacturing employee (200). But there are decision making guidelines (2000) established for manufacturing employee (200). In addition, manufacturing employee (200) will be evaluating coach (1) based on how well coach (1) communicates corporate vision, strategy and goals and provides the training and support needed by employee (200). The product flow is from now from "supplying" manufacturing employee (200) to "customer" manufacturing employee (300). "Customer" manufacturing employee (300) will like "Supplier" manufacturing employee (200) also be empowered to make decisions (3000). "Customer" manufacturing employee (300) will as a customer evaluate its "supplying" manufacturing employee (200) as indicated by the new evaluation (32). This evaluation will be a multi-dimensional evaluation based on items like timeliness, cost, quality, functionality and other as appropriate. "Customer" manufacturing employee (300) adds "supplying" manufacturing employee's (200) subassembly to other components to create a product. "Supplying" manufacturing employee's (200) then moves the product to the next employee in the process and in doing so, evolves from a being a "customer" to becoming a "supplier." Now as a "supplier" (300) subsequently will receive evaluations from its "customer" manufacturing employee not shown in FIG. 2. Every worker assumes the role of supplier who must satisfy the needs of its customer . . . it must get to know its customer.

It should be noted that coach (1) "supplying" manufacturing employee 200 (200) and "customer" manufacturing employee 300 (300) are each Micro Business Units (MBU) Node network entities.

The evaluation information flow is a set of Micro Business Units performance results. Said results may be as simple as satisfactory or not satisfactory. However, a set Micro Business Units performance results incorporating the rating system as disclosed above is generally more desirable.

The present invention detects, records and communicates evaluation information flows by incorporating an information flow communication detection and communication means between each Micro Business Units Node network entity. Now referring to FIG. 3. Device 121 (121) is adapted to detect, record and communicate information flow between "supplying" manufacturing employee (200) and Coach (100); Device 132 (132) is adapted to detect, record and communicate information flow between "customer" manufacturing employee 300 (300) "supplier" manufacturing employee (200). It also shows that limited decisions (2000) are made by employee (200) which are limited by guidelines. Said guidelines are advice and information dictated by the organization related to the decision options available to employee 200 (200). Similarly, it shows that limited decisions (3000) are made by employee (300) which are limited by guidelines. Said guidelines consist of advice and information dictated by the organization related to the task the employee is executing.

Said means may be devices adopted to detect, record and communicate messages between people disclosed on the organization chart, such as a wiretap on phone lines between phone operated by people disclosed on the organization chart. Other means may be Application Programming Interfaces configured to collect data and publish reports relating to the set of Micro Business Units Node network entities.

Upon receipt of said evaluation information flow said information is provided to a set of Artificial Intelligence (AI)-based learning models, wherein at least one member of the set of AI-based learning models is trained on a training data set of a set of Micro Business Units performance results operating data to classify the evaluation information flow as at least one of: an operating state (i.e. no change in the organization need be considered) or an error condition (i.e. at least one change in the organization should be evaluated) of at least one Micro Business Units Node entity of the set of Micro Business Units Node network entities.

In the event an error condition is detected by the AI, then the AI determines the potential risk of the error condition to Micro Business Units Node based upon, at least in part, an output of the AI-based learning classification of the at least one of: an operating state or an error condition.

If the AI communicates a proposed action to mitigate the potential risk in the Micro Business Units Node network. The proposed actions are recommended changes to the organization. For example, AI detects a significant performance issue at device 132 (132) it could notify subsequent Nodes of the issue and to recommend action. If the issue is catastrophic it could not only notify subsequent nodes but take a gating action and shut down production at all appropriate nodes.

Now referring to FIG. 7 which displays the communication among the Artificial Intelligence (AI) elements of the present inventions, namely the computer (7000) which run the Learning Machine element (7001) and the Generative Artificial Intelligence element (7002) of the present invention, the sensors devices (121 and 132). FIG. 7 displays several communication paths including, message stream 1327 (1327) whereby device 132 (132) communicates information and content of message stream (32) with the Machine Learning element (7001) located in computer (7000); message stream 1217 (1217) whereby device 121 (121) communicates information and content of message stream (12) with the Machine Learning element (7001) located in computer (7000).

Upon receiving data via message stream 1327 (1327) and via message stream 1217 (1217) run the Learning Machine element (7001) generates and updates algorithms related to improving the functioning of the organization to which the present invention has been adapted. Said algorithms are communicated to the Generative Artificial Intelligence element (7002) via a communication stream (7010). Upon receiving data via said communication stream (7010), the Generative Artificial Intelligence element (7002) send coach (100) and employee (200) information. Communications between the Generative Artificial Intelligence element (7002) and coach (100) are via data stream 7200 (7200) and communications between the Generative Artificial Intelligence element (7002) and employee 200 (200) are via data stream 7100 (7100).

To capture data, devices are placed throughout the Deep Value CSI network. In FIG. 7 there are two devices. Device (132) that capture numerical customer satisfaction data. This data reflects how satisfied manufacturing employee (300) is on a spectrum of measured elements with the work performance (results) of manufacturing employee (200). Device (132) transmits these results to the AI computer (7000). The AI computer (7000) is composed of a machine learning (ML) sector (7001) and a Generative AI sector (GAI) (7002). The ML sector (7001) will receive this input and combine it with other internal and external data in a learning process and output its findings to the GAI sector (7002). The GAI sector (7002) will analyze this input along with other intelligence and make recommendations back to manufacturing employee (200). Manufacturing employee (200) can then make decisions, within predefined guidelines, or they can dialog with the GAI (7002) for clarifications and enhancements to make even more informed decisions. GAI (7002) is becoming a copilot for manufacturing employee (200). Over time as it gets to know manufacturing employee (200), corporate direction and outside elements it will help manufacturing employee (200) make even better decisions. GAI (7002) will also start recommending process improvements to manufacturing employee (200) which, if accepted by management, will provide manufacturing employee (200) with financial rewards.

A similar process will take place between manufacturing employee (200) and coach (100). Device (121) will capture feedback from manufacturing employee (200) to coach (100) that captures how satisfied manufacturing employee (200) is with coach's (100) coaching in providing the necessary resources and explaining the company's vision, strategy and goals of the company and interpreting how they apple to manufacturing employee (200). Device (121) will then transmit these findings to the ML sector (7001) of the AI computer (7000). This ML sector (7001) will accept this information, compare this input with its database of information and enhance its learning capabilities. The ML sector (7001) will then pass its enhanced results to the GAI sector (7002). The GAI sector (7002) will then analyze this input, the stored corporate vision, strategy and objectives of the company along with other intelligence and make recommendations to coach (100). Coach (100) can accept, ignore or dialogue with GAI (7002) on its suggestions and then make decisions on its coaching effort. GAI (7002) is again becoming a copilot but this time for coach (100). Similar to its (7002) efforts with manufacturing employee (200) it will help make coach (100) become an even better coach for manufacturing employee (200).

The present invention is capable of eliminating or ameliorating creative destruction by implementing a business platform using Customer Centricity by combining Micro Business Units (MBUs) classification with both grid and spine flow analysis and Input/Process/Output Analysis. More specifically, the present invention is capable of providing images which motivate members of an organization to be more responsive to Timeliness/Quality/Cost/Functionality-Style-Brand/Innovation while strengthening existing organizational relationships.

The present invention requires the input of a traditional organization chart. A traditional organizational structure follows a system in which power flows upward through the organization, and all employees follow a chain of command.

The present invention reconfigures and displays a traditional organization chart in the form of a lean horizontal organization structure where: every function or group of functions is a Micro Business Unit (MBU); Internal functions interact with each other as customer and supplier; and the evaluation of customer satisfaction and innovation begins with external end customer satisfaction (CS) ratings given to company organizations with whom they interface. In turn, these end-customer facing organizations will look back and provide multi-faceted "customer satisfaction" and innovation ratings back to all the internal MBUs supplying them. This look-back process continues until all internal supplying MBUs have received Customer Satisfaction and innovation ratings from their internal customer MBUs.

Hierarchies were organizations where workers looked up to management for approval. These were organizations where "Results" came from an environment of authority, disengagement, and compliance. Deep Value CSI is an environment that achieves "Results" through trust, empowerment, and ownership. This is the Deep Value CSI environment.

Deep Value CSI Vs. Hierarchical Organizations

With Deep Value CSI's trust-based, flat and empowered organization the landscape of leadership changes dramatically. This structure emanates from the CEO trusting workers and empowering them in Micro Business Units (MBUs). Each MBU, composed of one or several individuals or a team, acts as both an internal Supplier and Customer and is the key to driving customer satisfaction internally. It takes the concept of customer satisfaction for the company and drives it inside to every organization, MBU relationship.

This robust, performance improving transformational "Future of Work" AI foundation is called Deep Value CSI. It overcomes the structural flaws of relic hierarchical organizations and current flat organizations. It enables culture to bloom, minimizes root causes of serious/deadly systemic business problems, unlocks unrecognized Deep Value and can scale savings of $50-70MM/yr. for a 3,000-employee company*. It takes the concept of Customer Satisfaction traditionally applied to the whole company and drives it inside the entire organization. It changes organizational relationships to one of Supplier-Customer. Deep Value CSI integrates:

(1) Micro Business Units (MBUs) . . . creating customer-supplier relationships
(2) Horizontal Interconnections of MBUs
(3) Unique Processes
(4) Proprietary Technology
(5) Management Vision/Strategy/Goals . . . Interpreted for each MBU with Guidelines that set limits (AI will continually help).

MBUs consist of people or teams performing distinct functions. The performance of all Customer-Supplier MBU interactions is reflected in Customer Satisfaction and Innovation ratings. This enables the CEO to consistently see directly as never before possible and in near real time using "vivid spread-sheet heat maps" of performance and innovation throughout every corner of the company or division. Numerical ratings are established for (a) multi-element internal Customer Satisfaction provided by Customer MBUs back to their Supplier MBUs . . . that fosters delivering "results" not just performing "activities." These include timeliness, cost, quality, functionality and others as appropriate. And (b) Innovation with rewards that drive significant growth in Innovation and Productivity. Workers are handsomely rewarded for their innovation. This innovation process becomes the replacement for Deep Value CSI's being a flatter organization with few promotions. For a ten-million-dollar innovation, workers can earn one million dollars. This in turn encourages workers to actively look for innovation and digital transformation opportunities related to their operations and not be blockers. It creates an agile Hyper-Learning organization.

As part of this MBU Customer-Supplier relationship, Customer MBUs are trained to thoroughly know their Customer MBU. Supplying Customer MBUs will be trained on Know-Their-Customer including:

Inputs required including:
Timeliness
Cost
Quality
Functionality
Other as appropriate
Process the Customer MBU employs including:
Person him/herself
Equipment used
Technology used
Software used
Sub-processes involved
Outputs MBUs and Grid Flow Analysis As a result, the present invention's platform treats each MBU as both a supplier and a customer of all the other MBU's in an entity. This better enables the concept of Customer Centricity to flow throughout the entire organization. Currently, this is not possible in the existing art.

The present invention uses grid and spine flow analysis to create and display maps. Said maps depict exponentially complex interconnection of the horizontally oriented MBUs (the core accomplishment of this invention); identifies customer satisfaction and innovation ratings for every internal MBU; highlights critical paths for customer satisfaction rating improvement; identifies recommended organizational modifications.

The innovation permitted due to the use of the grid flow analysis its many Vertical Input Bars (VIBs). The VIBs are the key to this invention . . . what makes it practical to implement. Said VIBs allow the users of the present invention to see images of simplified organization interfaces.

A Master MBU Chart pinpoints the performance of every aspect of a business using a spreadsheet depicting every company MBU. Along the top of the spreadsheet are the company functional areas (Receiving, Storage, Inspection, R&D, engineering, Marketing, Design, IT, Manufacturing, Teams, QC, Warehouse, Logistics, Sales . . . etc.). Along the vertical are numbers 1-n. Together they identify every MBU. It vividly shows in near real-time the performance of every corner of the company or division. Numerical ratings are established for (a) multi-element internal Customer Satisfaction provided by Customer MBUs back to their Supplier MBUs . . . that fosters delivering "results" not just performing "activities."

Each cell is color coded with one of typically five colors which change with the severity of the problem, in an embodiment with green being the best a 10 with yellow a 7 being a near problem and red a 6 being a real problem, and so forth. There is also a summary chart showing the poorest performance of all MBUs. These heat maps will change how business is managed. In near real time they will provide management with the exact location of performance and non-performance of the entire company . . . business X-Rays. This Early Problem Detection identifies hidden "tumors" before they become lethal.

When red or yellow cells first appear they will blink or otherwise make them noticeable. Management can then use AI and/or send in a Fly-in team to investigate the problem and identify if it is the root cause of the problem or is just in the flow of a more extensive problem. The root cause MBUs will be indicated by a small solid black triangle in its upper right corner. If it is just in the flow its cell color will still be red, but it will have a small white triangle in its upper right corner.

To facilitate investigating problems the investigator can call up from Magic Grid a subset of the interconnections of the problem MBU. Magic Grid is part of the proprietary technology behind Deep Value CSI Magic Grid enables the displaying of many inputs and outputs between literally thousands of MBUs.

In the Magid Grid there is a Vertical Input Bar (VIB) between the left column and right column of MBUs. Each MBU has a distinct identifier. Any output going to another MBU will have an arrow from the output MB to the VIB of the intended destination VIB. Then, there will be an arrow from the destination VIB to the actual destination MBU. In the background this is massively complex. However, Magic Grid will have the ability to portray a distinct subset on demand.

For example, when identifying a red state MBU a request can be made of Magic Grid to create a chart depicting 4 detailed MBUs and their interconnection of product/service and Customer Satisfaction. One could request a chart with one MBU proceeding the Supplying MBU in question along with two Customer and Customer's Customer MBUs following the MBU under investigation. Analyzing these will give a better picture of root cause locations. This process could be repeated several times for a more complete view. Also, an even more extensive view could be requested . . . more preceding and/or following MBUs.

In addition, by touching, pointing or other method each MBU cell can call for the MBU spread sheet cell to be expanded to a full MBU with all its content.

Moreover, a flow analysis grid is disclosed. In said grid every box is an MBU. As an example of navigating within said flow analysis grid:

Output from MBU 14 to MBU 11: MBU 14 shows an Output Arrow going to VIB 11. Going down VIB 11 opposite MBU 11 there is a bold Input Arrow going into MBU 11.

Customer Satisfaction from MBU 24 to MBU 4: MBU 24 shows a Customer Satisfaction, dotted line arrow, going to VIB 4. Going up VIB 4 opposite MBU 4 there is a dotted line input arrow going into MBU 4.

Output Arrows from and Input Arrows to MBU's show the flow of what is produced [products, services, or information (PSI)]. Outputs move from supplying MBUs to customer MBUs. However, the real value of Grid Flow Analysis (GFA) is the ability to see the reverse flow of Customer Satisfaction (CS) and Innovation throughout the organization. CS and Innovation ratings start with End Customers and flow back through every organization in the company. An MBU as supplier will receive its Customer Satisfaction and Innovation rating from its internal "Customer MBU." Its report will be based on how well its internal Customer MBU believes it performed on the following applicable Measurements:

Timeliness (T)
Quality (Q)
Cost (C)
Functionality-Style-Brand (F/S/B)
Innovation (I) . . . innovation incentives can be made to flourish throughout the entire organization, Innovation will be treated more as a "bonus" than a measurement.

When many MBUs are involved, the Vertical Input Bars (VIBs) can become very complex to view. When this happens MBU flows can be viewed in the bold "Spine" format.

The inputs/outputs from every MBU will go to and from the Spine. However, all arrows and text will be in a muted tone. Only MBU(s) and their flow arrows that are being analyzed will be highlighted. Deep Value CSI reduces the levels of a hierarchical organization by 40-60% making it flatter.

The grid flow analysis has certain functionality requirements and user interfaces. These requirements and interfaces may be embodied in computer software, more specifically as a software platform based on Excel directed by MACROS and as appropriate LAMBDA instructions Said Functionality Requirements (FR) and User Interfaces (UI). are as follows:

A. Reference Guide (RG)
B. Micro Business Unit (MBU)
 i. Data File (DF)
 ii. MBU Box
C. Grid
D. Security and Authorizations
E. Grid Flow Analysis as a Management Tool: Viewing and Reporting Capabilities The MGFA Platform has embedded in it a Reference Guide (RG). The RG will be populated by Human Resources (HR) and used by the MBU Data File and MBU Leaders. HR, working with Executive Management and organizational leaders, will identify and then input into the RG.

A. Business Functions:
 a. all [i.e., Manufacturing (M), Distribution (D], Warehouse (W), Marketing (Mkt.) . . . etc.)] along with their associated MBUs. There will be many MBUs comprising every Business Function.
 b. set the sequencing order on the Grid . . . the order of Business Function appearance (each with many MBUs) . . . i.e., 1st Stocking, 2nd Marketing, 3rd Engineering, 4th Manufacturing . . . etc.
 c. Business Function @10pt. up to 26 characters/line 2 lines
2. MBUs within the Business Functions: Each MBU will be composed of a function with a distinct/substantial output. For example, if several small parts make up a more substantial sub assembly, then the sub-assembly should be defined as the MBU. The same MBU Leader could be the Leader of more than one MBU
 a. Common Name up to 26 characters/line 2 lines
 b. Company I.D.
3. Corporate Data Access Buttons: HR will work with Executive Management to decide what access (what corporate databases (up to 5) and to what extent) will be made available on every MBU Box. Once decided, secure programing will facilitate this access and to what extent access will be enabled.

B. Micro Business Unit (MBU)

MBUs provide the intelligence for the Grid Flow Analysis (GFA) Platform. The following are the elements, sources and actions used in constructing MBUs:

1. MBU Data File (DF):

There is described the content and source of each MBU including:

| | | |
|---|---|---|
| 1. | Business Function | from RG |
| 2. | Common Name | from RG |
| 3. | Company I.D. | from RG |
| 4. | MBU Leader/Contact # | from MBU Leader |
| 5. | MBU Members | from MBU Leader |
| 6. | MBU Brief Description (235 characters) | MBU Leader |
| 7. | Product, Service, and Information: | |
| | a. Discrete Output(s): Very Brief Description and Grid #(s) | from MBU Leader will reference RG for Description. |
| | b. Input(s): Very Brief Description And Grid #(s) Source | MGFA System will access originating Grid # |
| 8. | Customer Satisfaction . . . each element (Timeliness, Quality, Cost, Functionality-Style-Brand, Innovation and Others) | |
| | a. Input(s): Grid #(s) Source and Ratings | MGFA System will access originating Grid # |
| | b. Each Discrete Output(s) | |
| | i. Grid #(s) Destination(s) | MBU Leader will reference RG for destination |
| | ii. Rating(s) (Most important Function for MBU Leader) | MBU Leader |
| 9. | Notes: Add any appropriate notes. (Will not be visible on Grid) | MBU Leader |

The DF contains all the information about every MBU. It will be used in developing the Grid and Reports. Only the specific MBU Leader will have access to his/her Data File for inputs and changes. Below shows the items that will populate each MBU DF and their Source.

2. MBU Box: The MGFA System will:
  a. Create one MBU Box for each Business Function MBU.
  b. Assign MBU Grid #s to each MBU Box:
    i. Each Business Function Group's numbering will start with the number 1 and be numbered sequentially within each Business Function. i.e., M1-M20, D1-D12, W1-W15, Mkt1-Mkt8 . . . etc.
    ii. For growth, the MGFA System will add 20% additional blank MBU boxes with Grid #s to each Business Function group. (Additional boxes will be rounded to even numbers . . . i.e., a 20% that equaled 2.3 would be rounded down to 2 additional MBU boxes while a 3.2 would be rounded up to 4 additional MBU boxes)
    iii. The Grid #s will then be added to each MBU in the Reference Guide.
  c. Access the:
    i. MBU Data Files for:
      1. Business Function with abbreviation
      2. Common Name
      3. Company I.D.
      4. MBU Leader/Contact #
      5. MBU Brief Description
      6. MBU Outputs (per above)
      7. Customer Satisfaction Elements
    ii. Reference Guide for the Corporate Data Access Buttons
  d. Set the MBU Box Width at 47 characters and will include:
    i. Business Function 26 and Grid #21 characters=47
    ii. Common Name 26 and Company I.D. 21 characters=47
  e. Adjust the variable Box Height in lines based on the sum of:
    i. Fixed data:
      a. Business Function [with abbreviation . . . i.e., Manufacturing (M)] and Grid Number 2 lines
      b. Common Name and Company I.D. 2 lines
      c. Corporate Data Access:
    i. Text 1 line
    ii. 2-5 equally spaced Buttons 2 lines
    ii. Variable Data:
      a. Product, Service, Information (PSI) Outputs . . . will now add in input/output area:
        i. 2¼ pt. Arrow(s) (1 to possibly 4+) 1 . . . n lines
        ii. Description(s) . . . above arrow 1 . . . n lines
        iii. Grid #destination(s) . . . below arrow 1+lines
      b. PSI Inputs . . . will now add in input/output area:
        i. 2¼ pt. Arrow (1 arrow) 1 line
        ii. MBU origination Grid #(s) 1+lines
      c. Customer Satisfaction (CS) Categories . . . Opposite:
        i. Timeliness in input/output area:
          1. Arrow out 1 line
          2. Destination Grid #/rating above 1+line(s)
          3. Arrow in 1 line
          4. Origination Grid #(s) rating above 1+line(s)
        ii. Quality (same as above) 2 lines
        iii. Cost (same as above) 2 lines
        iv. Functionality-Style-Brand (same as above) 2 lines
        v. Other(s) (same as above) 2 lines
        vi. Innovation . . . more of a "bonus" 1-5 stars (same as above) 2 lines
      d. Other Customer Satisfaction Input:
    i. Each MBU CS Category space will have a 1-10 scale built in. It will display the CS rating the Customer MBU(s) gives its Supplying MBU for all categories that apply. (i.e., Timeliness, Quality, Cost . . . etc.) If more than one Customer MBU provides ratings, it will display the lowest rating.
    ii. Based on pre-set rating levels designated by HR and Executive Management, the MGFA system will read MBU CS input ratings and color code . . . for example:
      1. Green (G) . . . for a 9-10 rating
      2. Black (B) . . . for a 8-9 rating
      3. Yellow (Y) . . . for a 7-8 rating
      4. Red (R) . . . for a below 7 rating
      5. Blank (B) . . . if CS Category is not applicable
    e. To clarify the GFA System will then add Arrows to the Inputs/Outputs. It will add:
    I. solid arrows for Product, Services and Information categories and
    II. other arrows for Customer Satisfaction Categories
    f. For odd #MBUs the MGFA System will only allow arrows and text on the right side of the MBU Box.
    g. For even #MBUs the MGFA System will only allow arrows and text on the left side of the MBU Box.

Continuing on with the MBU Model:
C. Grid Design
1. Grid Construction Part 1 MBUs on Grid . . . : The MFGA System will:
   a. sequentially place MBUs on an Excel grid by Business Function (with a fixed width and variable height as described earlier)
   b. all odd number MBUs will be placed on the LEFT side of the Grid with all input and out arrows and their descriptions on the right side of the MBU box . . . this is the left side MBU stack c. all even number MBUs will be placed on the RIGHT side of the Grid but all their input and output arrows and descriptions will be flipped to the left side of the MBU box . . . this is the right side MBU stack
2. Construction Part 2 VIB . . . The MFGA system will:
   a. insert one 3 pt. VIB between the left and right MBU stacks for each MBU. For example, for a full Grid, if there are 350 MBUs then the MFGA System will insert 350 VIBs. For a partial Grid with say 30 MBUs the MFGA System will insert the appropriate 30 VIBs.
   b. Add 2 additional VIB bars for Products, Services or Information coming from or going to external entities. Make one VIB the first VIB and the 2nd the last VIB.
   c. assign the appropriate Grid #above and below each VIB i.e., M15 for MBU Manufacturing Grid #15
   d. create a scheme that will enable the user viewing the large grid to see a range of VIB Business Function Symbols and Numbers (i.e., M1-D12) wherever they are on the Grid by using either:
      I. a Moving Ruler that will change to the appropriate VIB Symbols and numbers as a user moves across and up or down the Grid or
      II. scrolling technique where the VIB Business Function Symbols and Numbers will remain stationary, but the grid will be moving.
3. Construction Part 3 . . . The MFGA System will for Product, Service, Information (PSI) Arrow extensions:
   a. create one Output Arrow for "each" MBU PSI Output Arrow.
   b. start at the tip of the MBU Box Output Arrow and continue across the grid.
   c. terminate with an arrowhead at the destination Grid #VIB.
   d. for multiple destinations continue the arrow to each destination Grid #VIB each with an arrowhead. e. It will then read each Destination Grid #from the Supplying MBU Output(s). It will then list these Grid #below the Destination MBU's bold Input Arrow on the MBU box. This will allow viewing a bold MBU PSI input arrow and see where its Grid #(s) originate.
4. Construction Part 4 . . . The MFGA System will for Customer Satisfaction (CS) dotted Arrow extensions:
a. Output:
i. create one 2¼ pt. dotted line Output Arrow for each MBU Customer Satisfaction Output Arrow . . . each CS category.
ii. tart at the tip of the MBU box Customer Satisfaction dotted Output Arrow and continue across the grid.
iii. terminate with an arrowhead at the destination VIB.
iv. if a CS output rating, per CS Category, is being given to multiple Supplying MBUs, the arrow will continue until it reaches each VIB and have an arrow tip at each VIB.
b. Input:
I. It will then add a dotted CS input arrow from the MBU's VIB, for each CS Category, terminating at the specific CS Category on the MBU.
II. then add the originating Grid #/rating from the originating MBU above the input arrow . . . on each identified Customer MBU.
III. Repeat this for each MBU the Customer MBU identified.
IV. then display the CS rating in color as described previously.
V. Innovation will be treated more as a "bonus" with 1-5.
5. Construction Part 4 . . . Regarding assigning Grid #s the MFGA System will:
   a. Read all output Grid #s for all Product, Service, Information (PSI) and respectively Customer Satisfaction (CS)
   b. Add these Grid #s below the respective PSI and CS Input Arrows.
   c. MBU Leaders will then verify that they in fact use the input PSI items
D. Security Programing Rules:
1. MBU Corporate Access Buttons will only take a user to the "front door" of corporate databases. To access these databases the MGFA System will ensure normal corporate security requirements be met.
2. Corporate senior executive management will establish who will have access to what level of Grid visibility . . . its intelligence. This accessibility will be set based on the user's sign-in access code.
3. Only MBU managers will be enabled to modify their MBU. No other entity will be allowed input access. However, Human Resources will be charged with:
   a. Verifying and assuring consistency of MBU Business Functions and Common Name with the MBU manager
   b. Providing the MBU Leader with the function's Corporate I.D.
   c. Determining the best Business Function Sequence for the Grid and providing that to those with system responsibility.
E. Grid Flow Analysis as a Management Tool: Viewing and Reporting Capabilities
1. Executives will be able to view:
   a. The entire Grid or
   b. One or more specific MBU chains. A chain is an MBU along with all its preceding Supplying MBUs and all its Customer MBUs.
   c. They can also specify how many links (MBUs) they before and after a specific MBU they would like to view.
   d. Highlighted Customer Service Critical Paths. For a Red or Yellow CS rating, there will be an option for the CS Excel output/input Arrow cells and VBI cells to be highlighted in either Red or Yellow.
2. MBU Leaders will only have access, be able to see on the Grid, the chain of MBUs that serve as:
   a. suppliers to their MBU and
   b. customers of their MBU.
3. MBU Leaders can define the number of MBU Supplier and Customer links to view.
4. To enable viewing an MBU and its chains, the MGFA System will in real time create simplified grids for all users . . . with the option of specifying the number of forward and backward links (MBUs) to be viewed. Also, the Spine view is available for viewing large numbers of MBUs.

5. An array of Customer Satisfaction chart and graphic reports will be available for:
a. Customer Satisfaction:
  i. Inputs
  ii. outputs
b. PSI:
  i. Inputs
  ii. Outputs
6. Users will be able to:
a. Specify a specific MBU Grid #to view
b. Touch an Origin or Destination MBU Grid #and:
  i. All the lines getting to that MBU Grid Number will "flash" and
  ii. the grid will move to and display the designated MBU Grid #.

A simple Magic Grid with 6 MBUs and 6 VIBs is disclosed. The 3 odd numbered MBUs are on the left side of the page with their input/output arrows on the right side of their MBUs and the even numbered MBUs are on the right side of the page with their input/output arrows on its left side. In the middle of the page, between the left column of odd MBUs with their arrows and the right column of MBUs with their arrows are 6 VIBs, one representing each MBU. Every output arrow is extended to the VIB indicated by its destination. For example an MBU #3 product output (light line) is extended to VIB 4 its destination, representing its ultimate MBU destination. Then there is an output arrow (bold line) from VIB 4 as an input to MBU 4 to the product box in MBU 4. This process continues for every product/service, customer satisfaction and innovation element. Thus, one is now able to see the full performance status of these 6 MBUs Improvements to the reverse flow of customer satisfaction data may be achieved by implementing a weighting element to the customer satisfaction data. Said weighting may be implement by training a neural network across two stages of training set data so as to minimize false positives (a Type 1 error) for customer satisfaction data. More specifically, a rating which predicts an increase in customer satisfaction when in fact no statistically significant increase of customer satisfaction will occur.

More specifically, each customer satisfaction rating will be amplified or diminished by increasing or decreasing it by a fix amount (a weight) and then applying one or more of said weights to each customer satisfaction rating to create a modified set of customer satisfaction rating.

Following the application of said weights, creating a first training set comprising the collected set of customer satisfaction rating, the modified set of customer satisfaction rating and using these set to train a neural network by comprising weighted and unweighted training sets to determine which more accurately mimics actual customer satisfaction rating changes.

Said accuracy is measured by collecting sets of end user customer satisfaction rating following changes by individual micro business units and determining which weighting applications more nearly predicted the actual changes in end user satisfaction following changes by individual micro business units.

This invention's horizontal organization structure for business overcomes three critical deficiencies inherent in relic hierarchical organizations including their inhibiting:
  Communications . . . by their very nature hierarchical organizations delay by days, weeks, months or even years the identification of critical business problems. Like late cancer detection, late awareness of business problems in a complex organization structure can be detrimental and even deadly. On the other hand, this invention's transformational Magic Grid Flow Analysis (MGFA) enables near real-time . . . early . . . communications to key executives of.
  a company's business performance and non-performance for the entire company or a division . . . early problem detection is one of the key critical elements to business success and at times survival.
  external impediments to business operation
  Innovation. MGFA will foster an explosion of Innovation. Innovation is the second critical elements for business success.
  Management/employee cultural conflict. For this filing, it is sufficient to say that this invention enables a higher purpose of work, drives greater employee engagement and diminishes debilitating worker/management cultural challenges and is the third critical element for business success.
Communications—for Business Performance . . . (New):
  Master MBU Status Charts: The invention's MGFA enables Executive Management to vividly see (communicate) in near real-time the exact location (business X-Rays) of Performance/Non-Performance of every value-added MBU . . . Early Problem Detection. This capability is displayed on the new Master MBU Status Charts based on inputs provided by Customer MBU leaders. This one chart displays every MBU in the company/division and is made possible by the invention's VIB grid. There will be Master MBU Status Charts for:
  Overall Summary
  Timeliness
  Cost
  Quality
  Functionality . . . etc.
  These charts will be generated from the invention's MGFA platform based on customer satisfaction ratings given to each supplying MBU by its customer MBU Leader. They will be color coded to show the MBU's level of performance. When an MBU performance slips to red and to facilitate rapid management attention the invention will show the MBU cell pulsing. This will quickly enable management to pinpoint in near real-time the exact location of problems and to take timely action to correct any identified deficiency. AI will also take notice and make strategic recommendations.
  As in a mapping system a user can zoom in and out. So too with Magic Grid there is a zoom capability. As you zoom out you lose detail. A moderate zoom out might show 24 MBUs and their associated 24 VIBs, whereas a fully detailed MBU is reduced to a small rectangle with just the name of the MBU showing its product/service/information flows or specified customer satisfaction flow and rating.
  By touching (clicking):
    any MBU cell on the Master Charts, the invention will enable the details of that specific MBU to be displayed.
    specific areas of the MBU an information box will pop up giving additional MBU details.
  Context Button: To view any MBU on the Master Status Chart in context with associated MBUs, there is a Magic Grid Context Button. From the core Magic Grid platform containing literally hundreds and hundreds of MBUs (the original invention submission) the platform will now enable selecting and in real-time the invention will construct a viewable and printable user-friendly subset Magic Grid containing a limited number of MBUs for analysis. The context button will have options such as creating a subset Magic Grid containing the cell (MBU) being queried along with its supplying MBU and two subsequent customer MBUs. Options will be available to display more/fewer preceding and subsequent cells.

The details of an MBU are displayed in a vertical rectangle having:
- A. Business Function and Grid #on top. Below this is
- B. Company Name and Company I.D. Below this is
- C. Description of the MBU. Below this is
- D. 3-5 Corporate Data Access Buttons. Below this is
- E. Customer Satisfaction Measures (title). Below this is
    1. Timeliness with a color bar representing a rating of 1-10 below is
    2. Quality (same)
    3. Cost (same)
    4. Functionality-Style-Brand (same)
- F. Innovation (title) below is
    1. 5 stars (Those colored in indicate the level of innovation created by this MBU)
- G. Other optional Customer Satisfaction elements as needed.

To the right and outside of the MBU vertical rectangle are input and output arrows indicating:
- A. Direction (inbound-bold and outbound-light)
- B. Destination to/from (Grid #) and Rating (#)
- C. Solid line representing product/service/information flow
- D. Dotted lines for Customer Satisfaction As can often be the case, there may be a sequence of underperforming MBUs. Upon management investigation, the root cause MBU performance deficiency will be identified. Through the platform, management can display the root cause MBU on the MBU Master Charts. Management will have authorization to enable a small solid black triangle to appear on the red or yellow cell indicating this MBU is the root cause. For others in the flow of MBUs having problems as indicated by their red or yellow performance, management will enable a small white triangle to appear.

Each Customer Satisfaction rating will be color coded with a numerical component (Green 9.1-10, Turquoise 8.1-9, Light Blue 7.1-8, Yellow 6.1-7, Red 0-6). The invention will enable users to produce a wide variety of graphic performance charts based on statistical performance data.

A Change in Status button will enable viewing status changes over a specified interval (day, week, month, year) by the invention will pulse all MBUs that have changed during the specified interval.

Spine Grid.

A new Spine grid will also be an option for seeing a greater number of MBUs but with less interconnection detail. It will also have a zooming option.

Zooming with Circle MBUs:

This new zooming capability is analogous to map zooming.

Zoom out and MBU boxes convert to circles. (

MBU circles take the color of their lowest performing Customer Satisfaction rating.

By clicking on the circle MBU, its connection to its supplier and customer MBUs will go through the single spine and become highlighted.

By double clicking on a MBU circle its full MBU will pop up.

Communications—Critical Impediments . . . (New):

Critical Impediments . . . are external events/disasters . . . that can impact the company and in particular, a specific value-added MBU. These are items where management should focus attention. The invention will generate a new Master MBU Critical Impediments Chart. Critical impediments will be inputted into the platform by: the MBU leader being impacted by the impediment or other authorized management officials.

This chart, in a spreadsheet cell format containing all MBUs, will display these impediments using warning indicators in those MBU cells being impacted. The invention will pulse every newly added impediment indicator until deactivated by authorized management. Management is being provided another early indicator of problems . . . this time external problems.

A more detailed display indicates where the MBU vertical box is located in relationship to the Vertical Input Bars (VIBs). There is one VIB in the center of the display, one for each MBU. shows is that MBUs to the Left of the VIB bars will be assigned odd numbers (1, 3, 5, 7, 9 . . . etc.) and MBUs to the Right of the VIB bars will be assigned even numbers (2, 4, 6, 8, 10 . . . etc.)

Innovation . . . Key to Business Success . . . (New):

MGFA enables Executive Management to vividly see (have communicated) in near real-time the exact location (business X-Rays) of exactly where and to what extent innovation is happening in the company/division. The MGFA invention will display Innovation on the new Master MBU Innovation Chart from inputs provided by Customer MBU leaders in the form of green stars along with a 1-5 significance rating. This chart is again in the spreadsheet format a cell for every MBU. The invention will pulse the Stars until the identified innovation is analyzed by management for its full economic potential. One star indicates a good Innovation idea; five stars will indicate a phenomenal Innovation idea. Research conducted by Stanford professor Bob Sutton found that on average it takes 2,000 ideas to get to one commercial success. The best way to have a good idea is to have a lot of ideas. The invention's Master MBU Innovation Chart will be viewable by the entire company/division and will create expansive Innovation competition throughout the company/division. In turn, this competition will trigger an explosion in innovation. The motivation to innovate will be further amplified because the process associated with this invention directs management to provide very significant financial rewards for innovation.

Traditional hierarchical organizations provide career paths for employees. With this invention's MGFA horizontal organizations, vertical career paths will be more limited. However, a key component underpinning MGFA horizontal organizations is Innovation. In an MGFA Horizontal Organization environment significant rewards will be provided to workers for their innovation. The process accompanying the implementation of this invention supports rewards being given to the inventor in direct proportion to the economic benefits generated by the innovation. Thus, the rewards have the potential to be very significant. It is envisioned that in implementing this invention's MGFA Horizontal Organization structure, there could be (should be) workers who will make more money than the CEO. This invention enables significant financial rewards to be provided to "WORKERS" for being innovative and will become the replacement incentive to workers for reduced upward managerial mobility. It can't be emphasized enough how important Innovation is to a company's success and the competitive nature of the Master Innovation Chart and its financial rewards will cause an explosion in innovation. Furthermore, spreading these rewards over several years will further help retain the best employees.

Artificial Intelligence is a critical component of the MGFA Platform . . . the invention. It is being applied in two ways to:

Help verify the integrity of MBU leader provided Customer Satisfaction (CS) ratings as described above. Since these ratings are critical to . . . are the essence of . . . the effectiveness of MGFA, AI will be employed and continuously refined to assure the integrity/validity of MBU leader provided CS ratings.

Enable, once a sufficient historical database is developed, predictions of future 10-MBU functional performance and possibly company financial performance. AI will analyze:
  vast amounts of historical company MBU (nodes) CS data, and
  not only company historical MBU CS data but eventually the CS data of their outside supplier companies, who also have implemented the MGFA platform, along with third party data to obtain even earlier predictions of future performance.

The near-term frustration in implementing AI is that this transformational invention is creating never before available MGFA's Customer Satisfaction data. This MGFA invention is at the forefront of driving the concept of Customer Satisfaction and Innovation back throughout the company. Thus, it will take some time to develop sufficient data from this newly developed process to make viable AI predictions. Although data is not currently available, this invention will become a voracious user of AI capability.

The transition to a horizontal organization structure . . . where MBUs are both internal suppliers having internal customers they must satisfy and customers themselves who will be providing Customer Satisfaction and Innovation ratings back to their supplying MBUs will forever change business. This approach will dramatically flatten the organization structure and give workers a significant say in how, when and where work is performed. It will also set the environment for management to extend TRUST to workers.

The described invention . . . a transformational MGFA SaaS/AI platform . . . will profoundly redefine the Future of Work and forever change business by:
  Overcoming the Structural Flaws of Relic Hierarchical Organizations and replacing them with responsive Horizontal Organizations
  Diminishing Debilitating Worker/Management Cultural Challenges
  Revolutionizing how management will manage using near real-time vivid one-page visual displays depicting the status of the entire company/division . . . enabling critical Early Problem Identification.
  Exploding Innovation
  Unlocking Dramatic, Unrecognized and Sustainable Purpose and Value . . . that activist investors can only dream about.

The output of the present invention creates a higher purpose of work, drives greater employee engagement, and sets the stage for a Metaverse environment.

It will forever change:
b. Workers:
  i. All will have a customer(s) to satisfy
  ii. Rewards will be based on customer MBU perceived results
  iii. Minimum Micromanagement and greater TRUST
  iv. Have great:
    1. Flexibility
    2. Significant role in job design.

One chart in accordance with the present invention displays:
  Every MBU in the company/division
  Enables Executive Management to vividly see in near real-time the exact location (business X-Rays) of Performance/Non-Performance of every value-added MBU . . . Early Problem Detection.
  Charts for Summary, Timeliness, Cost, Quality, Functionality, etc.
  Callout for Expanded MBU
  Context Button enables viewing any MBU in context with associated MBUs
  root cause small solid black triangle in the flow a small white triangle.

Not shown (because it would require color) is a representation of a button to touch a cell on the MBU Status Chart, and an expanded MBU Pops-Up. Each Customer Satisfaction rating will be Color Coded with a Numerical Component (Green 9.1-10, Turquoise 8.1-9, Light Blue 7.1-8, Yellow 6.1-7, Red 0-6).

In other embodiments, a 4 MBU Magic Grid shows all details, but highlights the ability to point to any information element and get a pop-up callout with a summary of the element of interest.

An example of a 4 MBU Model is a Subset Magic Grid: Magic Grid With its Vertical Input Bars (VIBs) is the heart of the invention and is what enables exponentially complex interconnections. From the core Magic Grid platform containing hundreds of MBUs the platform will in real-time construct a subset Magic Grid with a limited number of MBUs. Options to display more/fewer preceding and subsequent MBUs.

In one zoom display, the VIBs collapse to but one Vertical Input Bar. This particular chart shows full sized MBUs with all their details. However, if zooming out continues the MBUs are continually reduced in size and detail until they are but small circles with a color code indication for the poorest customer service result.

The MBU SPINE Grid enables seeing a greater number of MBUs but with less interconnection detail. Zooming option with MBU boxes converting to MBU circles with less detail (Circle view not shown). The MBU circles take the color of their lowest performing customer satisfaction rating.

The Master MBU Innovation Chart shows how innovation is recognized by stars with an associated 1-5 descriptor. This descriptor gives an indication of the significance of the innovation. A 1 indicates a good innovation and a 5 indicates a fabulous innovation. These stars are not just stars, they represent dollars of savings, of which 10% will be awarded to the worker(s) associated with this savings. This chart not only give an indication of economic benefits to workers, but it will also make being innovative more and more competitive among MBUs and drive innovation for the company. It will also motivate workers not to run from but to seek digital transformation for their area. It will drive a Hyper-Learning community based on trust, empowerment and being rewarded.

The Master MBU Innovation Chart depicts:
  Innovation from inputs provided by Customer MBU leaders.
  One green star indicates a good Innovation idea five stars indicates a phenomenal Innovation idea.
  Innovation stars generates significant financial rewards
  Rewards become the replacement incentive for reduced horizontal org. upward mobility.
  Innovation . . . critical to success explodes from competition and rewards.

An MBU spreadsheet indicates for specific MBUs a problem for that MBU that is outside the MBU's control. For example, something happened to an MBU material supplier that is used by that MBU. It is an early warning system. Warnings can be posted by an MBU leader who becomes aware of a problem. Warnings will also be posted by AI that will scour the environment for potential problems striving to give the earliest warning of problems.

A spreadsheet depicts external events/disasters that can impact the company and in particular, a specific value-added MBU, noting that
1. Each shaded cell represents one MBU.
2. Each yellow warning is a message from the MBU that there is an Impediment happening beyond their control
3. 356 cells 5 or 1.4% with Impediments.
4. Click on the cell to see Full MBU.

Practitioners in the art will appreciate that variations of the foregoing may be adapted without departing from the spirit of the within invention.

I claim:

1. A system configured to generate messages and initiate tangible alarm signals comprising:
    a flat, non-hierarchical organization chart,
    at least two phones,
    at least two micro business unit users,
    at least one phone line disposed between said at least two micro business unit users,
    at least one wiretap device,
    a digital computer,
    visual heat map device,
        wherein said visual heat map device is adapted to display elements in marked contrast against a background,
    at least one alarm device configured to generate said tangible alarm signal,
        wherein said tangible alarm signal is a multicolored map comprising vertical input bars,
        said map is configured to allow said users to zoom in and zoom out, and
        wherein said at least two phones are connected by said at least one phone line operated by said users, and
        wherein said users are people disclosed on said organization chart, and
        wherein said at least one wiretap device is disposed upon and adapted to intercept communications on said at least one phone line, and further adapted to sending said communications to said digital computer, and
        wherein said digital computer is adapted to receiving signals from said at least one wiretap device, said at least one wiretap device adapted to detect, record and communicate messages between said people, using artificial intelligence to process said communications, and adapted to sending at least one signal to said at least one alarm device, and
        wherein said at least one alarm device is adapted to receiving said signals and displaying at least one high chroma, pulsing or tangible warning message in near real-time on said visual heat map device to alert at least one member of an organization,
    communicating, between said at least two micro business unit users:
    generating, output data base on said communicating;
    providing, to the trained machine learning model, input data comprising current operating status data, wherein said input data are generated by application program interfaces or wiretaps on said at least one phone line;
    receiving, from the trained machine learning model, output data, based on the input data, comprising a value that indicates that said alarm should be triggered;
    triggering, based on the output data, said alarm;
    receiving, via a user interface, user input associated with said alarm; and
    further training, based on the user input, the trained machine learning model
    thereby transforming said organization's structure over time from a hierarchical to a flat, horizontal structure resulting in increased customer and employee satisfaction
    wherein said system is configured to enable an alarm augmented trained machine learning model trained using training data comprising a history of an organization's customer satisfaction information data, a machine learning model to output, based on input operating status data, an indication of whether an alarm should be triggered, wherein training the machine learning model comprises modifying one or more weights of one or more nodes of an artificial neural network; and
    wherein said system is configured to generate said tangible alarm signals as directed by said trained machine learning model.

* * * * *